US009898679B2

(12) United States Patent
Weismuller et al.

(10) Patent No.: US 9,898,679 B2
(45) Date of Patent: Feb. 20, 2018

(54) RESOLVING CLOSELY SPACED OBJECTS

(71) Applicant: The Boeing Company, Chicago, IL (US)

(72) Inventors: Thomas P. Weismuller, Orange, CA (US); David L. Caballero, Huntington Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 833 days.

(21) Appl. No.: 14/504,575

(22) Filed: Oct. 2, 2014

(65) Prior Publication Data
US 2017/0024891 A1  Jan. 26, 2017

(51) Int. Cl.
| | |
|---|---|
| *G06K 9/00* | (2006.01) |
| *G06K 9/46* | (2006.01) |
| *G06K 9/40* | (2006.01) |
| *G06K 9/32* | (2006.01) |
| *G06T 7/70* | (2017.01) |
| *F41G 7/30* | (2006.01) |
| *G06T 7/10* | (2017.01) |
| *G06K 9/62* | (2006.01) |
| *G06T 5/00* | (2006.01) |
| *G06K 9/34* | (2006.01) |

(52) U.S. Cl.
CPC ............... *G06K 9/40* (2013.01); *F41G 7/308* (2013.01); *G06K 9/3241* (2013.01); *G06K 9/4604* (2013.01); *G06K 9/6218* (2013.01); *G06T 5/002* (2013.01); *G06T 7/10* (2017.01); *G06T 7/70* (2017.01); *G06K 9/34* (2013.01); *G06K 2209/21* (2013.01); *G06T 2207/10048* (2013.01); *G06T 2207/30212* (2013.01); *G06T 2207/30242* (2013.01)

(58) Field of Classification Search
None
See application file for complete search history.

(56) References Cited

U.S. PATENT DOCUMENTS

| | | | |
|---|---|---|---|
| 6,260,466 B1 * | 7/2001 | Humphreys | F41G 3/08 89/41.03 |
| 7,330,565 B1 * | 2/2008 | Der | G06K 9/3241 340/933 |
| 8,094,063 B1 * | 1/2012 | Cammerata | G01S 7/2927 342/179 |
| 8,538,071 B2 | 9/2013 | Asnis | |
| 2004/0050240 A1 * | 3/2004 | Greene | F41G 3/06 89/41.06 |

(Continued)

OTHER PUBLICATIONS

Weismuller et al., "Isotropic Feature Matching," U.S. Appl. No. 14/025,266, filed Sep. 12, 2013, 46 pages.

(Continued)

*Primary Examiner* — Matthew Bella
*Assistant Examiner* — Jose M Torres
(74) *Attorney, Agent, or Firm* — Yee & Associates, P.C.

(57) ABSTRACT

A method and apparatus for resolving a set of objects in an image of an area. A partition that captures a set of objects is identified using the image. The partition is comprised of a group of contiguous object pixels. A number of local max pixels are identified from the group of contiguous object pixels in the partition. A quantitative resolution of the set of objects captured in the partition is performed based on the number of local max pixels identified.

16 Claims, 14 Drawing Sheets

(56) References Cited

U.S. PATENT DOCUMENTS

| | | | | |
|---|---|---|---|---|
| 2005/0045825 A1* | 3/2005 | Murata | ............... | G01S 17/89 |
| | | | | 250/342 |
| 2006/0257004 A1* | 11/2006 | Chen | ................ | G01S 3/7864 |
| | | | | 382/103 |
| 2011/0254969 A1* | 10/2011 | Tyurina | ............ | G06K 9/00134 |
| | | | | 348/222.1 |
| 2012/0020515 A1* | 1/2012 | Robinson | ............ | G06K 9/3241 |
| | | | | 382/103 |

OTHER PUBLICATIONS

Schulenburg et al., "Beysian approach to image recovery of closely spaced objects," SPIE vol. 1954, Apr. 1993, pp. 82-93.

* cited by examiner

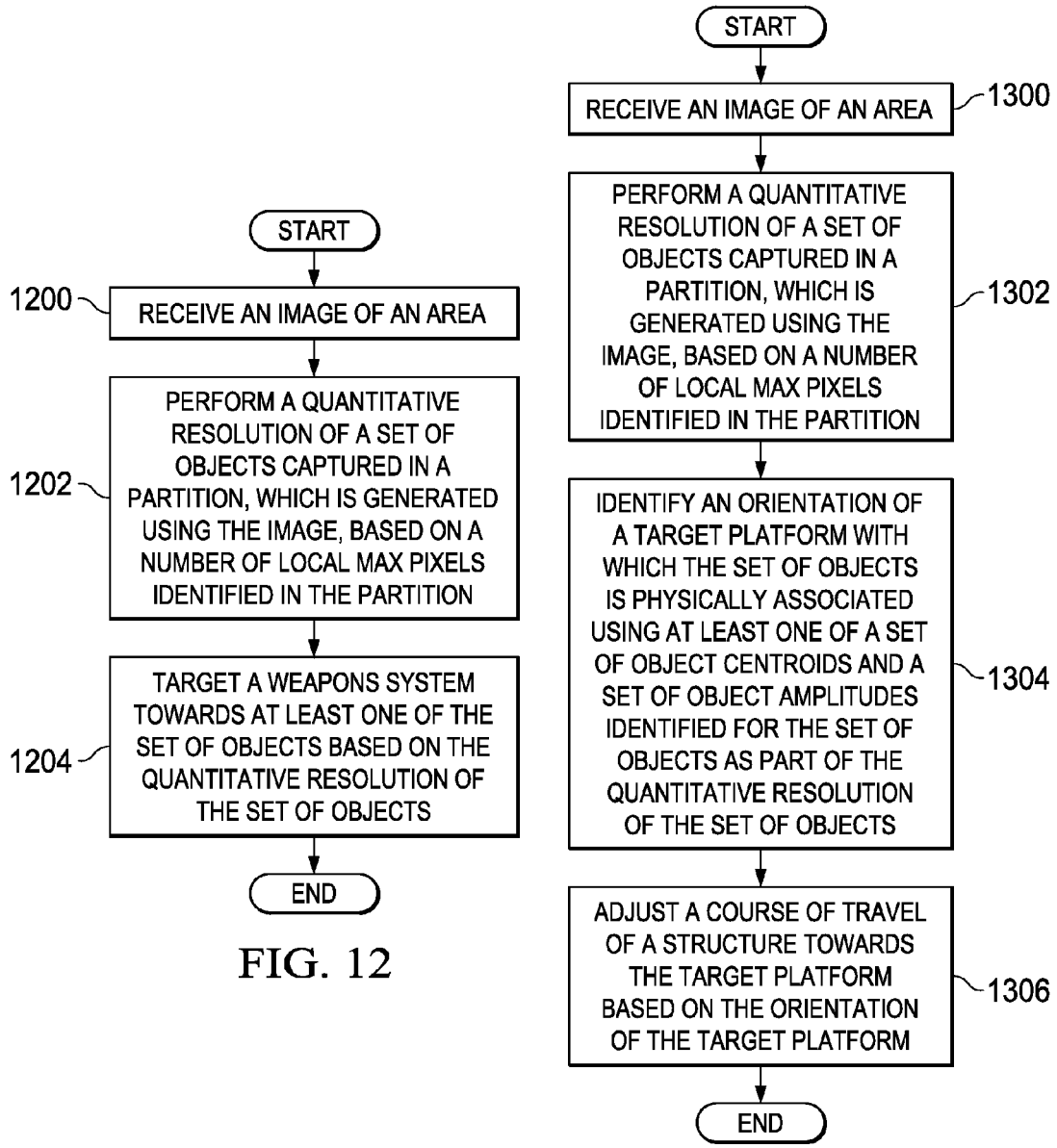

RESOLVING CLOSELY SPACED OBJECTS

BACKGROUND INFORMATION

1. Field

The present disclosure relates generally to image processing and, in particular, to resolving closely spaced objects in images. Still more particularly, the present disclosure relates to a method, apparatus, and system for resolving a set of objects in an image of an area such that a determination as to whether any of the set of objects is an object of interest may be made and at least a position of any object of interest may be identified with a desired level of accuracy.

2. Background

Sensor systems may be used to detect and track different types of objects that move in an area. These different types of objects may include, for example, without limitation, aircraft, unmanned aerial vehicles (UAVs), spacecraft, satellites, missiles, automobiles, tanks, unmanned ground vehicles (UGVs), people, animals, and other types of objects. Further, these objects may be detected and tracked using different types of sensor systems. These different types of sensor systems may include, for example, without limitation, visible light imaging systems, electro-optical (EO) imaging systems, infrared (IR) sensor systems, near-infrared sensor systems, ultraviolet (UV) sensor systems, radar systems, and other types of sensor systems.

As one illustrative example, a sensor system may be used to generate still images or video of an area. These images may be used to detect and track objects of interest in the area. In some situations, two or more objects that are within close proximity in the area being observed may appear in a same region of an image. These objects may be referred to as a "cluster." For example, when the lines of sight from a sensor system to two or more objects in the area being observed are within some selected proximity of each other, the portions of the image representing these objects may partially overlap such that the objects appear as a cluster in the image. In particular, when these objects are point objects, the portions of the image defined within the point spread functions for these point objects may partially overlap.

When the portions of an image representing these objects overlap by more than some selected amount in an image or in different images in a sequence of images, distinguishing between these objects and tracking these objects independently in the cluster in the sequence of images may be more difficult than desired. Some currently available methods for distinguishing between the objects in a cluster in a sequence of images may take more time, effort, and processing resources than desired. Further, these currently available methods may be unable to track movement of the objects with a desired level of accuracy. Still further, some of these currently available methods may be unable to resolve a cluster when the cluster includes more than two objects. Therefore, it would be beneficial to have a method and apparatus that take into account at least some of the issues discussed above, as well as possibly other issues.

SUMMARY

In one illustrative embodiment, a method for resolving a set of objects in an image of an area is provided. A partition that captures the set of objects in the area is generated using the image. The partition is comprised of a group of contiguous object pixels. A number of local max pixels are identified from the group of contiguous object pixels in the partition. A quantitative resolution is performed of the set of objects captured in the partition based on the number of local max pixels identified.

In another illustrative embodiment, a method for resolving objects in an image of an area is provided. A partition that captures a set of objects in the area is identified using the image. The partition is comprised of a group of contiguous object pixels. A number of local max pixels are identified from the group of contiguous object pixels in the partition. A quantitative resolution of the set of objects captured in the partition is performed based on the number of local max pixels identified to identify a set of object centroids and a set of object amplitudes for the set of objects. An object-related operation corresponding to at least one of the set of objects is performed based on at least one of the set of object centroids or the set of object amplitudes.

In yet another illustrative embodiment, an apparatus comprises an image processor. The image processor generatines a partition that captures a set of objects in an area using an image. The partition is comprised of a group of contiguous object pixels. A number of local max pixels are identified from the group of contiguous object pixels in the partition. A quantitative resolution of the set of objects captured in the partition is performed based on the number of local max pixels identified. An object-related operation corresponding to at least one object in the set of objects can be performed based on the quantitative resolution.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 12 is an illustration of a process for targeting a weapons system in the form of flowchart in accordance with an illustrative embodiment;

FIG. 13 is an illustration of a process for adjusting a course of travel towards a target platform in the form of flowchart in accordance with an illustrative embodiment;

DETAILED DESCRIPTION

The illustrative embodiments recognize and take into account different considerations. For example, the illustrative embodiments recognize and take into account that it may be desirable to have a system capable of resolving clusters of objects that appear in images more quickly and more accurately than is possible with some currently available image processors. Further, the illustrative embodiments recognize and take into account that it may be desirable to perform a quantitative resolution of a cluster of objects in an image more quickly and with reduced processing resources as compared to some currently available image processors.

Thus, the illustrative embodiments provide a method and apparatus for resolving objects. In one illustrative embodiment, a method for resolving objects in an image of an area is provided. A partition that captures a set of objects in the area is generated using the image. The partition is comprised of a group of contiguous object pixels. A number of local max pixels are identified from the group of contiguous object pixels in the partition. A quantitative resolution of the set of objects captured in the partition is performed based on the number of local max pixels identified.

Quantitatively resolving the set of objects may include identifying a set of object centroids and a set of object amplitudes for the set of objects. With the quantitative resolution provided by the illustrative embodiments described below, the set of objects may be resolved even when the set of objects includes two, three, or some other number of objects. Further, with this type of quantitative resolution, a contribution of each of the set of objects to the total energy of each object pixel in the group of contiguous object pixels may be computed.

Based on this quantitative resolution, a number of actions may be taken. For example, each of the set of objects may be evaluated to determine whether that object is an object of interest. Further, a set of positions for the set of objects may be identified. In some cases, an orientation of a target platform with which the set of objects is associated may be identified such that a course of travel towards the target platform may be adjusted accordingly.

The quantitative resolution described by the illustrative embodiments may enable these actions and other types of object-related operations to be performed quickly. For example, the quantitative resolution described by the illustrative embodiments may enable decision-making with respect to the set of objects to be performed more quickly.

Figure 1:
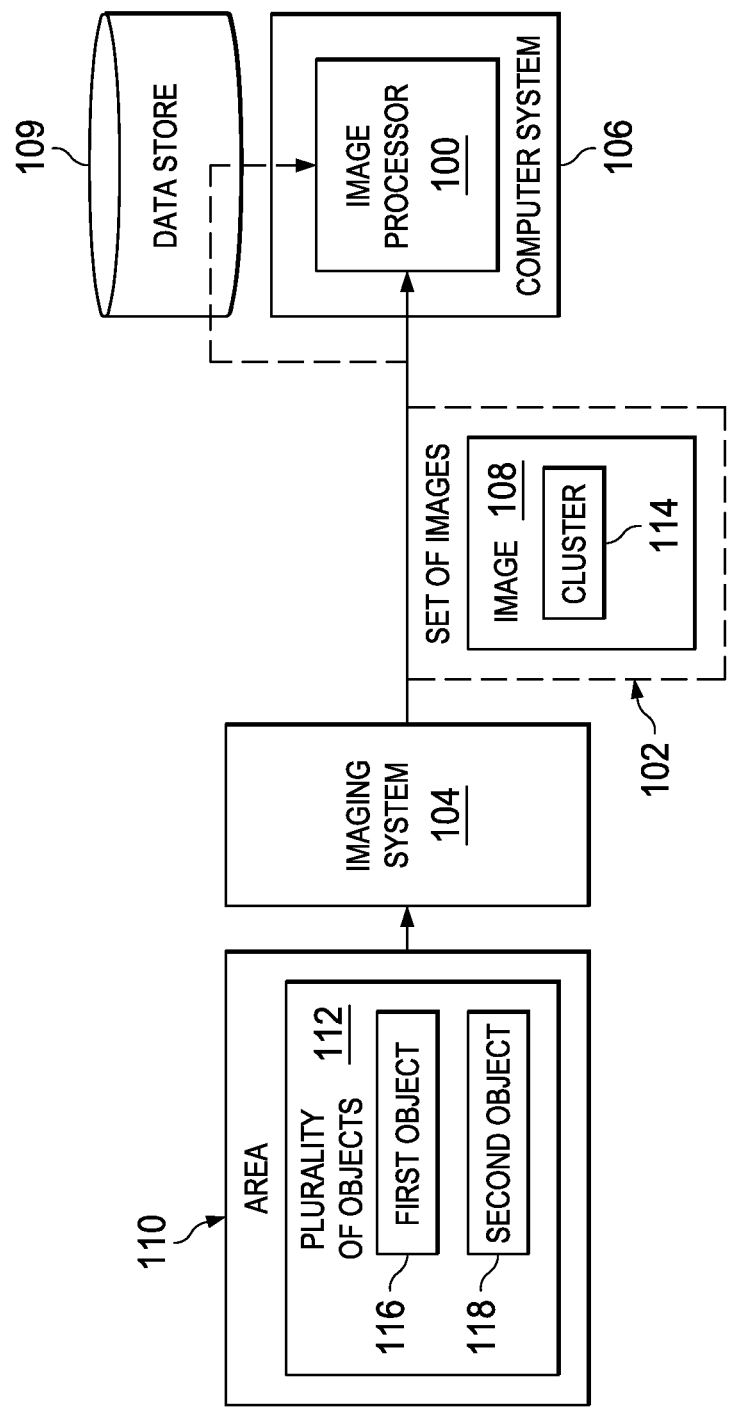
FIG. 1 is an illustration of an image processor in the form of a block diagram in accordance with an illustrative embodiment.

Referring now to the figures and, in particular, with reference to FIG. 1, an illustration of an image processor is depicted in the form of a block diagram in accordance with an illustrative embodiment. In this illustrative example, image processor 100 may be used to process set of images 102 received from imaging system 104.

Imaging system 104 may take a number of different forms. Depending on the implementation, imaging system 104 may take the form of, for example, without limitation, a visible light imaging system, an electro-optical (EO) imaging system, an infrared (IR) imaging system, a near-infrared imaging system, an ultraviolet (UV) imaging system, a radar imaging system, a video camera, or some other type of imaging system.

As used herein, a "set of" items may include one or more items. In this manner, set of images 102 may include one or more images. In one illustrative example, set of images 102 may include one or more still images. In another illustrative example, set of images 102 may be a sequence of images that form a video. When set of images 102 forms a video, set of images 102 may also be referred to as a set of frames.

In these illustrative examples, each of set of images 102 may capture an area. Image 108 may be an example of one of set of images 102. Image 108 may be of area 110. Area 110 may take a number of different forms. For example, without limitation, area 110 may be a region of airspace, a region in space, a neighborhood, an area of a town or city, a portion of a roadway, an area over a body of water, a terrestrial region, an area inside a building, an area within a manufacturing facility, a portion of a biological sample viewed through a microscope, a portion of a chemical sample viewed through a microscope, a portion of a material viewed through a microscope, or some other type of area.

One or more objects may be present within area 110 and captured in image 108. However, in some cases, distinguishing between these objects may be difficult when two or more objects appear as a cluster in image 108. As one illustrative example, plurality of objects 112 may be present within area 110 captured in image 108. In image 108, plurality of objects 112 may be closely spaced objects that appear as cluster 114. In other words, distinguishing between plurality of objects 112 may be difficult or impossible without further processing.

For example, plurality of objects 112 may include first object 116 and second object 118. First object 116 and second object 118 may be point objects. As used herein, a "point object," with respect to the imaging domain, is an object that may be treated as a point source. As used herein, a "point source" is a single identifiable localized source of something, such as energy.

In these illustrative examples, a point source may be considered a single identifiable localized source of electromagnetic radiation. The electromagnetic radiation may take the form of, but is not limited to, visible light, infrared light, ultraviolet light, radio waves, or some other type of electromagnetic radiation. A point source may have negligible extent. An object may be treated as a point source such that the object may be approximated as a mathematical point to simplify analysis, regardless of the actual size of the object.

The response of imaging system 104 to a point object may be referred to as the point spread function (PSF). The energy carried within the electromagnetic radiation emitted by a point object may appear as blurring in the image of the point object generated by imaging system 104.

As one illustrative example, first object 116 and second object 118 may be blurred in image 108. In particular, the energy captured by imaging system 104 for each of first object 116 and second object 118 may be spread out over a finite area comprised of any number of pixels in image 108. First object 116 and second object 118 may appear in image 108 as cluster 114 when these finite areas overlap. Image processor 100 may be used to resolve cluster 114 such that first object 116 and second object 118 may be distinguished from each other. Although only first object 116 and second object 118 are depicted in FIG. 1, cluster 114 may be formed by any number of objects. In other illustrative example, cluster 114 may be formed by first object 116, second object 118, and a third object. In yet other examples, cluster 144 may be formed by more than three objects.

In this illustrative example, image processor 100 may be implemented in software, hardware, firmware, or a combination thereof. When software is used, the operations performed by image processor 100 may be implemented using, for example, without limitation, program code configured to run on a processor unit. When firmware is used, the operations performed by image processor 100 may be implemented using, for example, without limitation, program code and data and stored in persistent memory to run on a processor unit.

When hardware is employed, the hardware may include one or more circuits that operate to perform the operations performed by image processor 100. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In some illustrative examples, the operations and processes performed by image processor 100 may be performed using organic components integrated with inorganic components. In some cases, the operations and processes may be performed by entirely organic components, excluding a human being. As one illustrative example, circuits in organic semiconductors may be used to perform these operations and processes.

In one illustrative example, image processor 100 may be implemented using computer system 106. Computer system 106 may be comprised of any number of computers. When computer system 106 includes multiple computers, these computers may be in communication with each other.

Depending on the implementation, image processor 100 may be implemented as part of imaging system 104 or independently of imaging system 104. In some cases, image processor 100 may be located remotely with respect to imaging system 104. Further, depending on the implementation, image processor 100 may receive set of images 102 from imaging system 104 through any number of wired communications links, wireless communications links, optical communications links, or other types of communications links.

In one illustrative example, image processor 100 may receive set of images 102 from imaging system 104 in substantially "real-time" or "near real-time." In other words, image processor 100 may receive set of images 102 from imaging system 104 without significant delay. For example, image processor 100 may be configured to receive each image in set of images 102 as that image is generated by imaging system 104.

In other illustrative examples, image processor 100 may receive set of images 102 some period of time after set of images 102 has been generated. In one illustrative example, image processor 100 may be configured to retrieve set of images 102 from data store 109. Data store 109 may be implemented on computer system 106 or may be separate from computer system 106, depending on the implementation.

Data store 109 may be implemented using hardware, software, firmware, or a combination thereof. Data store 109 may be comprised of any number of databases, data repositories, files, servers, file systems, other types of data storage, or combination thereof. In some cases, image processor 100 may be configured to retrieve set of images 102 in response to an occurrence of an event. The event may be, for example, without limitation, a command being received, a message being received, a lapse of a timer, a particular user input being received, or some other type of event.

Image processor 100 may process each of set of images 102 to resolve any clusters of objects in the image. For example, image processor 100 may process image 108 to resolve cluster 114 that includes plurality of objects 112. An example of one implementation for image processor 100 is depicted in and described in FIG. 2 below. In particular, an example of one manner in which image 108 may be processed by image processor 100 is described in FIG. 2 below.

Figure 2:
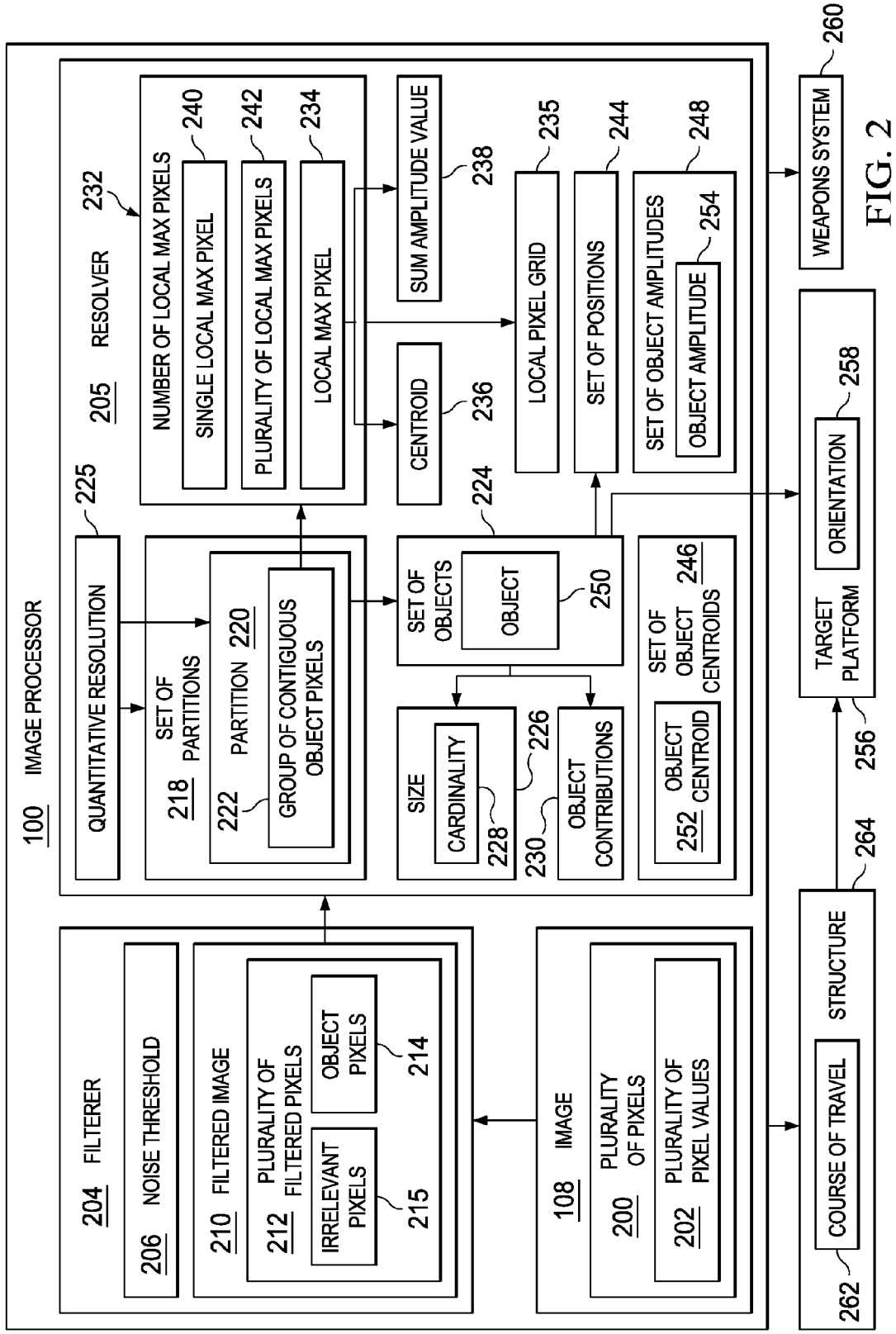
FIG. 2 is an illustration of an image processor in the form of a block diagram in accordance with an illustrative embodiment.

With reference now to FIG. 2, an illustration of image processor 100 from FIG. 1 is depicted in the form of a block diagram in accordance with an illustrative embodiment. As depicted, image processor 100 may receive image 108 for processing.

Image 108 may be comprised of plurality of pixels 200. Plurality of pixels 200 may be arranged in the form of, for example, an n×m grid, where n indicates the number of rows and m indicates the number of columns. Plurality of pixels 200 may have plurality of pixel values 202. Plurality of pixel values 202 may be based on the energy detected by imaging system 104 in FIG. 1. In this illustrative example, plurality of pixel values 202 may be a plurality of total energy values. In other words, each of plurality of pixel values 202 may be a total energy value for a corresponding pixel in plurality of pixels 200. The total energy value may represent the total energy captured within that corresponding pixel by imaging system 104 in FIG. 1.

As depicted, image processor 100 may include filterer 204 and resolver 205. Each of filterer 204 and resolver 205 may be implemented using hardware, software, firmware, or some combination thereof.

Filterer 204 may filter image 108 using noise threshold 206. Noise threshold 206 may be selected such that any of plurality of pixels 200 in image 108 having a pixel value below or equal to noise threshold 206 may be considered noise. Noise threshold 206 may be, for example, without limitation, the sum of (1) the mean pixel value for all of plurality of pixel values 202 and (2) the product of a constant and a noise factor. The noise factor may be based on the pixel to pixel standard deviation. Both the noise factor and the constant may be obtained based on the characteristics of the imaging system that generated the image. For example, the noise factor and the constant may be obtained empirically based on the characteristics of the imaging system. In one illustrative example, the constant may be between about 2 and 4.

Consequently, when noise threshold 206 is applied to image 108, any of plurality of pixels 200 in image 108 having a pixel value below or equal to noise threshold 206 may be excluded as being an object pixel. An object pixel may be a pixel that captures the energy contributed by at least one object.

Filterer 204 may apply noise threshold 206 to image 108 to generate filtered image 210 comprised of plurality of filtered pixels 212. In particular, any pixel in image 108 having a pixel value below or equal to noise threshold 206 may be set to become a filtered pixel having a pixel value of substantially zero. A filtered pixel having a pixel value of substantially zero may be considered an irrelevant pixel, which may be a pixel that is not an object pixel. Thus, a filtered pixel having a pixel value above zero may be considered an object pixel.

In this manner, plurality of filtered pixels 212 may include object pixels 214 and irrelevant pixels 215. Irrelevant pixels 215 may have pixel values of substantially zero, while object pixels 214 may have non-zero values.

Resolver 205 may receive filtered image 210 for processing. Resolver 205 may first identify set of partitions 218 in filtered image 210. In this manner, set of partitions 218 may be ultimately considered as being generated, or created, using image 108 because filtered image 210 is generated using image 108.

Resolver 205 may identify set of partitions 218 by identifying each of object pixels 214 in filtered image 210 that is immediately adjacent to at least one other one of object pixels 214. In this manner, one or more groups of contiguous object pixels may be identified. Each group of contiguous object pixels identified forms a partition in set of partitions 218.

Each of set of partitions 218 may capture one or more objects. Resolver 205 may process each of set of partitions 218 to quantitatively resolve the one or more objects in each partition.

As one illustrative example, set of partitions 218 may include partition 220. Partition 220 may be comprised of group of contiguous object pixels 222 that captures set of objects 224. Resolver 205 may process partition 220 to perform quantitative resolution 225 of set of objects 224. Performing quantitative resolution 225 may also be referred to as quantitatively resolving set of objects 224. Performing quantitative resolution 225 of set of objects 224 may include determining size 226 of set of objects 224. Size 226 may be the number of objects in set of objects 224. Size 226 of set of objects 224 may also be referred to as cardinality 228 of set of objects 224.

Further, performing quantitative resolution 225 of set of objects 224 may also include computing object contributions 230 for set of objects 224. Object contributions 230 may include the contribution of each of set of objects 224 to a total energy of each of group of contiguous object pixels 222. In other words, object contributions 230 may include the contribution of each of set of objects 224 to the pixel value of each object pixel in group of contiguous object pixels 222 in which the pixel value of the object pixel represents the total energy capture by that object pixel. In this manner, a set of contributions may be identified for set of objects 224 for each object pixel in group of contiguous object pixels 222.

In this illustrative example, resolver 205 may process partition 220 to identify number of local max pixels 232 in partition 220. In particular, resolver 205 may identify each object pixel in group of contiguous object pixels 222 that is entirely surrounded by pixels, which may include object pixels or irrelevant pixels, having lower pixel values than the pixel value of that object pixel as a local max pixel. In other words, an object pixel in group of contiguous object pixels 222 may be identified as a local max pixel when that object pixel has a higher pixel value than all of the pixels immediately adjacent to that object pixel. In this manner, a local max pixel may not be an object pixel that is at the edge of partition 220.

Resolver 205 may then compute a centroid and a sum amplitude value for each of number of local max pixels 232. For example, number of local max pixels 232 may include local max pixel 234. Resolver may identify local pixel grid 235 for local max pixel 234. Local pixel grid 235 may be, for example, the 3 by 3 grid of object pixels in partition 220 centered around local max pixel 234. Thus, local pixel grid 235 may include eight object pixels centered around local max pixel 234. In this illustrative example, each of these eight object pixels may have a pixel value that is lower than the pixel value of local max pixel 234.

Resolver 205 may compute centroid 236 and sum amplitude value 238 for local max pixel 234. Centroid 236 may be computed as follows:

$$x_{o,n} = \frac{1}{A_n} \sum_{i \in \{GRn\}} x_i p_i, \quad (1)$$

and $$y_{o,n} = \frac{1}{A_n} \sum_{i \in \{GRn\}} y_i p_i, \quad (2)$$

where $$A_n = \sum_{i \in \{NGn\}} p_i, \quad (3)$$

and where $x_{o,n}$ and $y_{o,n}$ are the coordinates for centroid 236, n represents local max pixel 234, i is an index for the object pixels in local pixel grid 235, $x_i$ and $y_i$ are the coordinates for the $i^{th}$ object pixel, $p_i$ is the pixel value of the $i^{th}$ object pixel, NGn represents all the object pixels in local pixel grid 235, and $A_n$ is sum amplitude value 238.

The manner in which partition 220 is further processed may be determined based on whether number of local max pixels 232 includes single local max pixel 240 or plurality of local max pixels 242. An example of one manner in which partition 220 may be further processed when partition 220 includes only single local max pixel 240 and when partition 220 includes plurality of local max pixels 242 is described in the flowchart in FIGS. 4A and 4B below.

Resolver 205 uses the centroid and sum amplitude computed for each of number of local max pixels 232 to perform quantitative resolution 225 of set of objects 224 in partition 220. Quantitatively resolving set of objects 224 may include identifying set of object centroids 246 and set of object amplitudes 248 for set of objects 224. For example, object 250 may be an example of one of set of objects 224. Resolver 205 may compute object centroid 252 and object amplitude 254 for object 250. Object centroid 252 may be a two-dimensional point in image 208 at which object 250 is located. In particular, object centroid 252 may be the point at which a point spread function that is generated by resolver 205 for object 250 may be located with respect to image 208. Object amplitude 254 may be the amplitude of this point spread function for object 250.

Once set of objects 224 has been quantitatively resolved, any number of actions may be taken. For example, further processing may be performed to determine whether any of set of objects 224 is a particular object of interest. For example, set of object amplitudes 248 may be used to determine whether any of set of objects 224 is an object of interest, such as, but not limited to, a missile, an unauthorized aircraft located in restricted airspace, an unauthorized projectile located in a restricted space, a hostile object, a reflector, a location marker, an astronomical object, or some other type of object of interest.

In one illustrative example, set of object centroids 246 may be used to identify set of positions 244 for set of objects 224. Set of positions 244 may include a position in physical space with respect to some reference coordinate system for each of set of objects 224. Any number of transformation algorithms may be used to transform set of object centroids 246 into set of positions 244.

Set of positions 244 may be used to target set of objects 224. For example, weapons system 260 may be targeted towards an object in set of objects 224 that has been identified as an object of interest using the corresponding position in set of positions 244 identified for that object. As one illustrative example, one of set of objects 224 may be identified as a missile. Weapons system 260 may be targeted towards the missile using the position identified for the missile to reduce or eliminate a threat of the missile.

In another illustrative example, set of objects 224 may be known to be physically associated with target platform 256. As one illustrative example, target platform 256 may be a space station and set of objects 224 may take the form of a set of reflectors attached to the space station. Orientation 258 of target platform 256 may be computed using at least one of set of positions 244 and set of object amplitudes 248 for set of objects 224.

Course of travel 262 of structure 264 may be adjusted based on orientation 258 of target platform 256 such that an accuracy with which structure 264 moves towards target platform 256 may be improved. For example, structure 264 may take the form of an aerospace vehicle that is traveling to dock with target platform 256 in the form of a space station. Identifying orientation 258 of target platform 256 may be crucial to ensuring that the aerospace vehicle properly docks with the space station.

In this manner, an object-related operation may be performed based on quantitative resolution 225 of set of objects 224 by resolver 205. Resolver 205 may be configured to quantitatively resolve set of objects 224 with increased speed and improved accuracy as compared to currently available image processors such that decision-making with respect to performing one or more object-related operations may be made more accurately and earlier in time. An object-related operation may be any operation having to do with at least one of set of objects 224.

As used herein, the phrase "at least one of," when used with a list of items, means different combinations of one or more of the listed items may be used and only one of the items in the list may be needed. The item may be a particular object, thing, action, process, or category. In other words, "at least one of" means any combination of items or number of items may be used from the list, but not all of the items in the list may be required.

For example, "at least one of item A, item B, or item C" or "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The illustrations of image processor 100 in FIGS. 1 and 2 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 3:
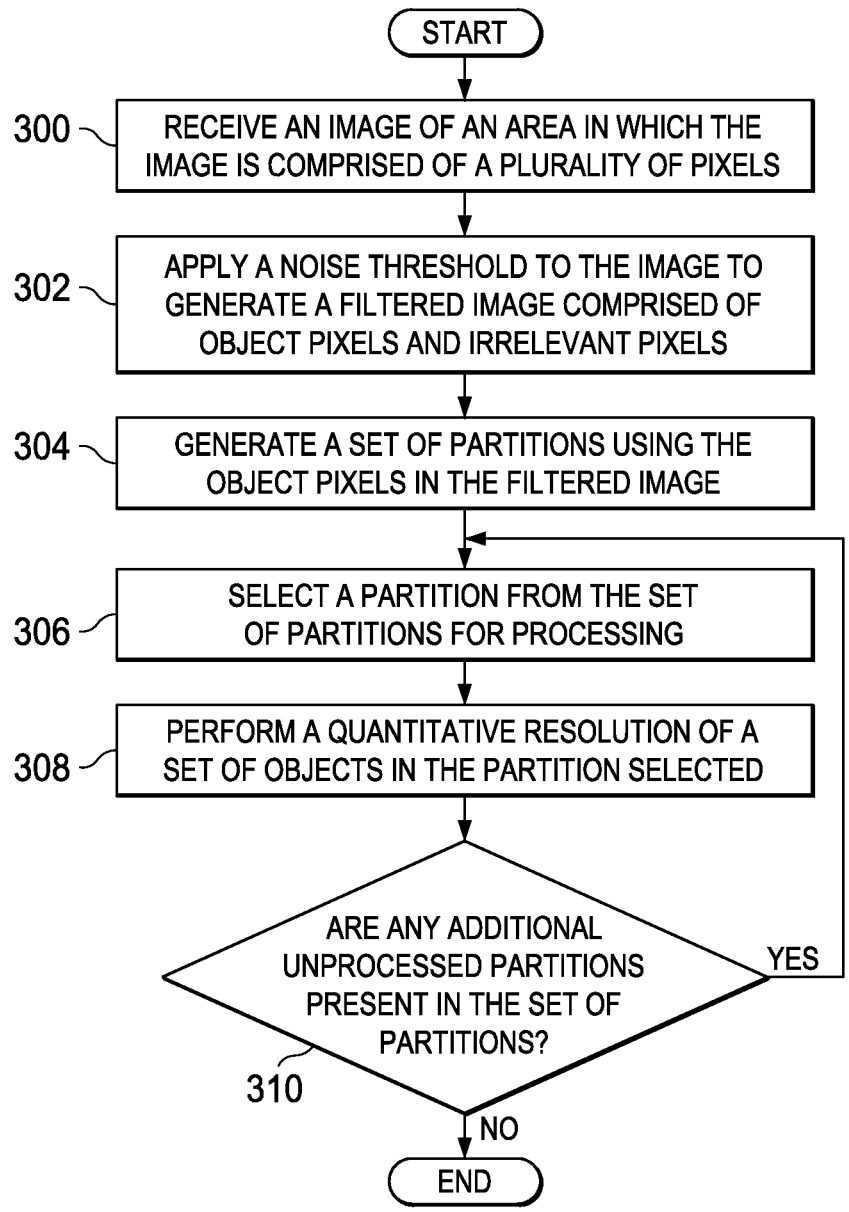
FIG. 3 is an illustration of a process for processing an image in the form of a flowchart in accordance with an illustrative embodiment.

With reference now to FIG. 3, an illustration of a process for processing an image is depicted in the form of a flowchart in accordance with an illustrative embodiment. The process illustrated in FIG. 3 may be implemented using image processor 100 in FIGS. 1-2.

The process may begin by receiving an image of an area in which the image is comprised of a plurality of pixels (operation 300). Next, a noise threshold is applied to the image to generate a filtered image comprised of object pixels and irrelevant pixels (operation 302). In operation 302, any pixel in the image having a pixel value below or equal to the noise threshold may be set to become an irrelevant pixel having a pixel value of substantially zero. In this manner, pixels in the original image that are considered to capture the energy of noise, rather than the energy of an object, may become irrelevant pixels.

In operation 302, any pixel in the image having a pixel value above the noise threshold may be identified as an object pixel. In this manner, pixels in the original image that are considered as capturing the energy of at least one object may become object pixels. In these illustrative examples, no change may be made to the pixel values of pixels identified as object pixels. However, in other illustrative examples, the pixel values of object pixels may be adjusted.

Thereafter, a set of partitions are generated using the object pixels in the filtered image (operation 304). In particular, each of the object pixels in the filtered image that is immediately adjacent to at least one other object pixel may be identified as being part of a group of contiguous object pixels. In operation 304, one or more groups of contiguous object pixels may be identified. Each group of contiguous object pixels that is identified establishes a partition. In other words, each group of contiguous object pixels defines a partition. In this manner, each of the set of partitions generated in operation 304 may be comprised of a group of contiguous pixels that captures a set of objects. In other words, each of the set of partitions may capture at least one object.

Next, a partition is selected from the set of partitions for processing (operation 306). A quantitative resolution of a set of objects in the partition selected is performed (operation 308). An example of one manner in which the quantitative resolution of a set of objects in a partition may be performed is described in FIGS. 4A and 4B below.

A determination may then be made as to whether any additional unprocessed partitions are present in the set of partitions (operation 310). If no additional unprocessed partitions are present, the process terminates. Otherwise, the process returns to operation 306 described above.

The process described in FIG. 3 may be repeated for any number of images. As one illustrative example, the process described in FIG. 3 may be repeated for each image in a set of images, such as set of images 102 in FIG. 1. The set of images may be, for example, a number of still images or a set of frames in a video.

Figure 4A:
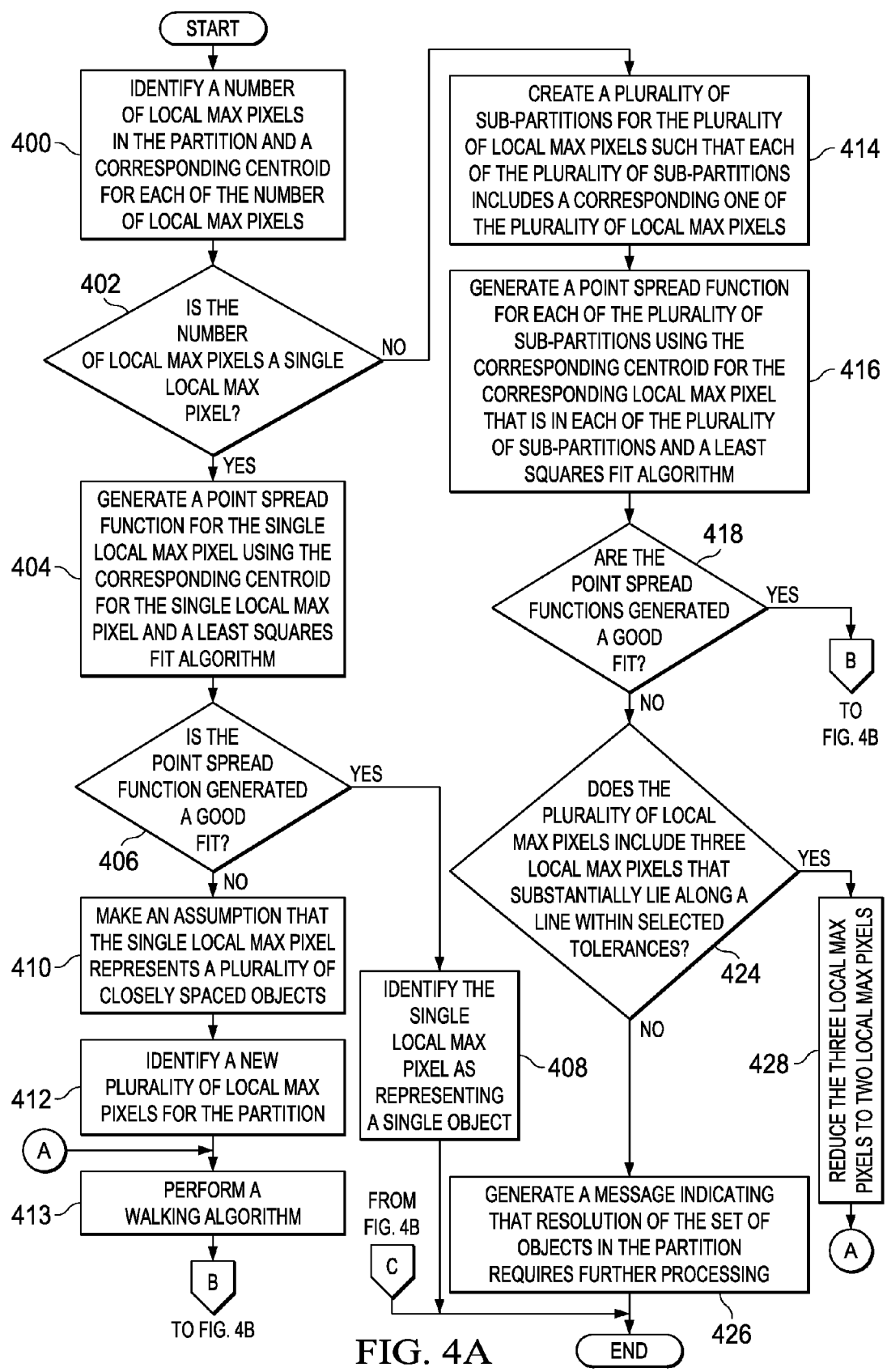
FIGS. 4A and 4B are illustrations of a process for performing a quantitative resolution of a set of objects in a partition in the form of a flowchart in accordance with an illustrative embodiment.
Figure 4B:
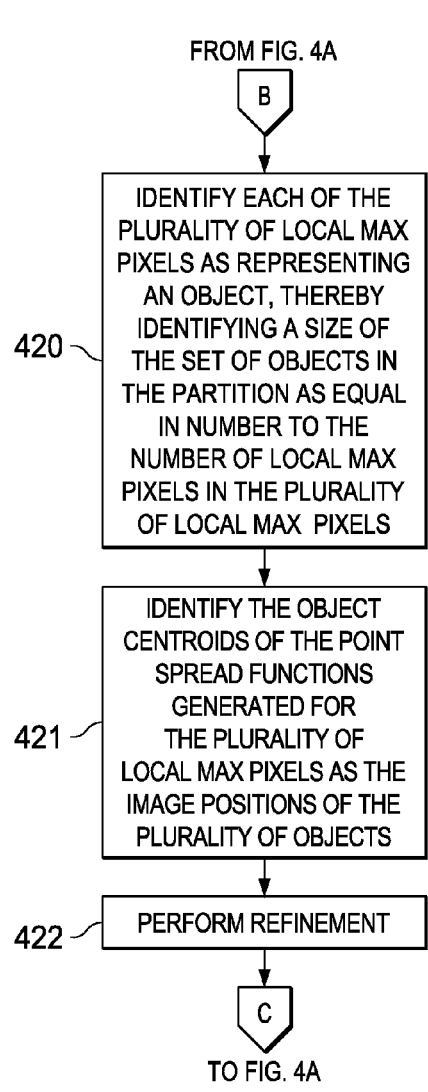

With reference now to FIGS. 4A and 4B, illustrations of a process for performing a quantitative resolution of a set of objects in a partition is depicted in the form of a flowchart in accordance with an illustrative embodiment. The process illustrated in FIGS. 4A and 4B may be implemented using image processor 100 in FIGS. 1-2. In particular, the process described in FIGS. 4A and 4B may be an example of one manner in which operation 308 in FIG. 3 may be implemented.

The process may begin by identifying a number of local max pixels in the partition and a corresponding centroid for each of the number of local max pixels (operation 400). In operation 400, the partition may be the partition selected for processing in operation 306 in FIG. 3. Further, in operation 400, the corresponding centroid for a local max pixel is identified by identifying the coordinates for the centroid of the local max pixel. These coordinates may be, for example, without limitation, sub-pixel x and y coordinates. An example of one manner in which operation 400 may be performed is described in FIG. 5 below.

Next, a determination is made as to whether the number of local max pixels is a single local max pixel (operation 402). In making this determination, if the number of local max pixels is not a single local max pixel, then the number of local max pixels is considered a plurality of local max pixels. If the number of local max pixels is a single local max pixel, a point spread function is generated for the single local max pixel using the corresponding centroid for the single local max pixel and a least squares fit algorithm (operation 404).

In operation 404, the least squares fit algorithm is used to generate the point spread function having amplitude, $I_0$, at an object centroid, $(x_c, y_c)$. The object centroid may be at or around the corresponding centroid of the single local max pixel. For example, in some cases, performing the least squares fit algorithm may include moving the point at which the point spread function is generated around in order to obtain the final point spread function. The point at which the final point spread function is generated after performing the least squares fit algorithm is the object centroid.

A determination is then made as to whether the point spread function generated is a good fit (operation 406). An example of one manner in which this determination may be made is described in FIG. 6 below.

If the point spread function generated is a good fit, then the single local max pixel is identified as representing a single object (operation 408), with the process terminating thereafter. Otherwise, if the point spread function generated is not a good fit, then an assumption is made that the single local max pixel represents a plurality of closely spaced objects (operation 410). For example, in operation 410, the assumption may be that the single local max pixel represents two closely spaced objects.

A new plurality of local max pixels are then identified for the partition (operation 412). An example of one manner in which operation 412 may be performed is described in FIGS. 7A and 7B below. Next, a walking algorithm is performed (operation 413), with the process then proceeding to operation 420 described further below. An example of one manner in which operation 413 may be performed is described in FIG. 9 below.

Alternatively, in some cases, operation 412 may not be able to be performed. For example, performing operation 412 may result in the generation of a message indicating that resolution of the set of objects requires further processing. In these types of cases, the process may terminate after operation 412 without proceeding to operation 413.

With reference again to operation 402, if the number of local max pixels identified in operation 400 above is not a single local max pixel and thereby, is a plurality of local max pixels, a plurality of sub-partitions is created for the plurality of local max pixels such that each of the plurality of sub-partitions includes a corresponding one of the plurality of local max pixels (operation 414). An example of one manner in which operation 414 may be performed is described in FIG. 8 below.

Thereafter, a point spread function is generated for each of the plurality of sub-partitions using the corresponding centroid for the corresponding local max pixel that is in each of the plurality of sub-partitions and a least squares fit algorithm (operation 416). As described above, the point spread function generated for each $n^{th}$ sub-partition may include an amplitude, $(I_0)_n$, and an object centroid, $(x_c, y_c)_n$ for that sub-partition. In some cases, the object centroid may be at the corresponding centroid for the $n^{th}$ local max pixel in the $n^{th}$ sub-partition. In other cases, the object centroid may be offset from the $n^{th}$ local max pixel in the $n^{th}$ sub-partition.

Next, a determination is made as to whether the point spread functions generated are a good fit (operation 418). In one illustrative example, each of the point spread functions for the plurality of sub-partitions may be evaluated in a manner similar to the manner in which the point spread function for single local max pixel is evaluated in operation 406. For example, each of the point spread functions for the plurality of sub-partitions may be evaluated in a manner similar to the process described in FIG. 6 below that is used to evaluate the point spread function for the single local max pixel. In other illustrative examples, the point spread functions may be collectively evaluated.

If the point spread functions generated are a good fit, each of the plurality of local max pixels is identified as representing an object, thereby identifying a size of the set of objects in the partition as equal in number to the number of local max pixels in the plurality of local max pixels (operation 420). For example, in operation 420, two local max pixels may be identified as representing two objects; three local max pixels may be identified as representing three objects; or five local max pixels may be identified as representing five objects.

The object centroids of the point spread functions generated for the plurality of local max pixels are identified as the image positions of the plurality of objects (operation 421). Depending on the implementation, these image positions that are with respect to a two-dimensional coordinate system for the image may be later transformed into a set of positions for the set of objects with respect to a two-dimensional or three-dimensional reference coordinate system.

Thereafter, refinement may be performed (operation 422), with the process terminating thereafter. In some illustrative examples, operation 422 may be an optional step.

In one illustrative example, the refinement performed in operation 422 may include returning to operation 416 described above using the object centroids for the plurality of sub-partitions instead of the corresponding centroids for the plurality of local max pixels to generate the new point spread functions. In this manner, the accuracy of the final object centroids generated may be improved.

With reference again to operation 418, if the point spread functions generated are not a good fit, a determination may be made as to whether the plurality of local max pixels includes three local max pixels that substantially lie along a line within selected tolerances (operation 424). If the plurality of local max pixels does not include three local max pixels that substantially lie along the line within selected tolerances, a message is generated indicating that resolution of the set of objects in the partition requires further processing (operation 426), with the process terminating thereafter. In other words, a solution is not found and other types of methods or additional processing may be needed to resolve the set of objects in the partition.

With reference again to operation 424, if the plurality of local max pixels includes three local max pixels that substantially lie along a line within selected tolerances, the three local max pixels are then reduced two local max pixels (operation 428), with the process then proceeding to operation 413 described above. As one illustrative example, the two outer local max pixels along the line are used with the middle local max pixel being excluded. In some cases, the middle local max pixel may be used in place of the single local max pixel for the purposes of performing the walking algorithm in operation 413.

Figure 5:
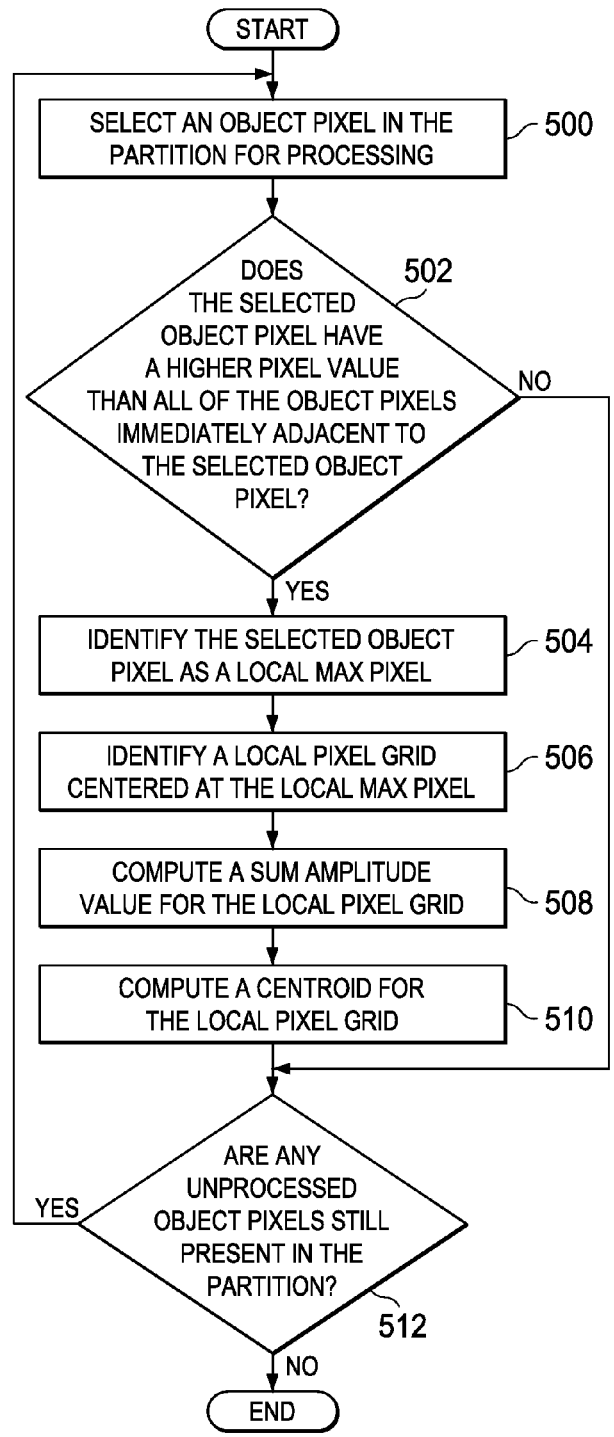
FIG. 5 is illustration of a process for identifying a number of local max pixels in a partition and information for each of the number of local max pixels in the form of a flowchart in accordance with an illustrative embodiment.

With reference now to FIG. 5, an illustration of a process for identifying a number of local max pixels in a partition and information for each of the number of local max pixels is depicted in the form of a flowchart in accordance with an illustrative embodiment. The process illustrated in FIG. 5 may be implemented using image processor 100 in FIGS. 1-2. In particular, this process may be an example of one manner in which operation 400 in FIG. 4A may be implemented.

The process may begin by selecting an object pixel in the partition for processing (operation 500). This object pixel may be one of the group of contiguous object pixels in the partition. In one illustrative example, only object pixels not located at the edge of the partition may be selected for processing in operation 500.

A determination is made as to whether the selected object pixel has a higher pixel value than all of the object pixels immediately adjacent to the selected object pixel (operation 502). In other words, in operation 502, a determination is made as to whether the selected object pixel is entirely surrounded by object pixels having lower pixel values than the pixel value of the selected object pixel.

If the selected object pixel has a higher pixel value than all of the object pixels immediately adjacent to the selected object pixel, the selected object pixel is identified as a local max pixel (operation 504). Next, a local pixel grid centered at the local max pixel is identified (operation 506). The local pixel grid may be, for example, without limitation, a 3 by 3 pixel grid centered at the local max pixel.

Thereafter, a sum amplitude value is computed for the local pixel grid (operation 508). Next, a centroid is computed for the local pixel grid (operation 510). In this illustrative example, the sum amplitude value computed in operation 508 may be used to compute the centroid in operation 510.

A determination may then be made as to whether any unprocessed object pixels are still present in the partition (operation 512). If no unprocessed pixels are present, the process terminates. Otherwise, the process returns to operation 500 as described above. With reference again to operation 502, if the selected object pixel does not have a higher pixel value than all of the object pixels immediately adjacent to the selected object pixel, the process proceeds to operation 512 as described above.

Figure 6:
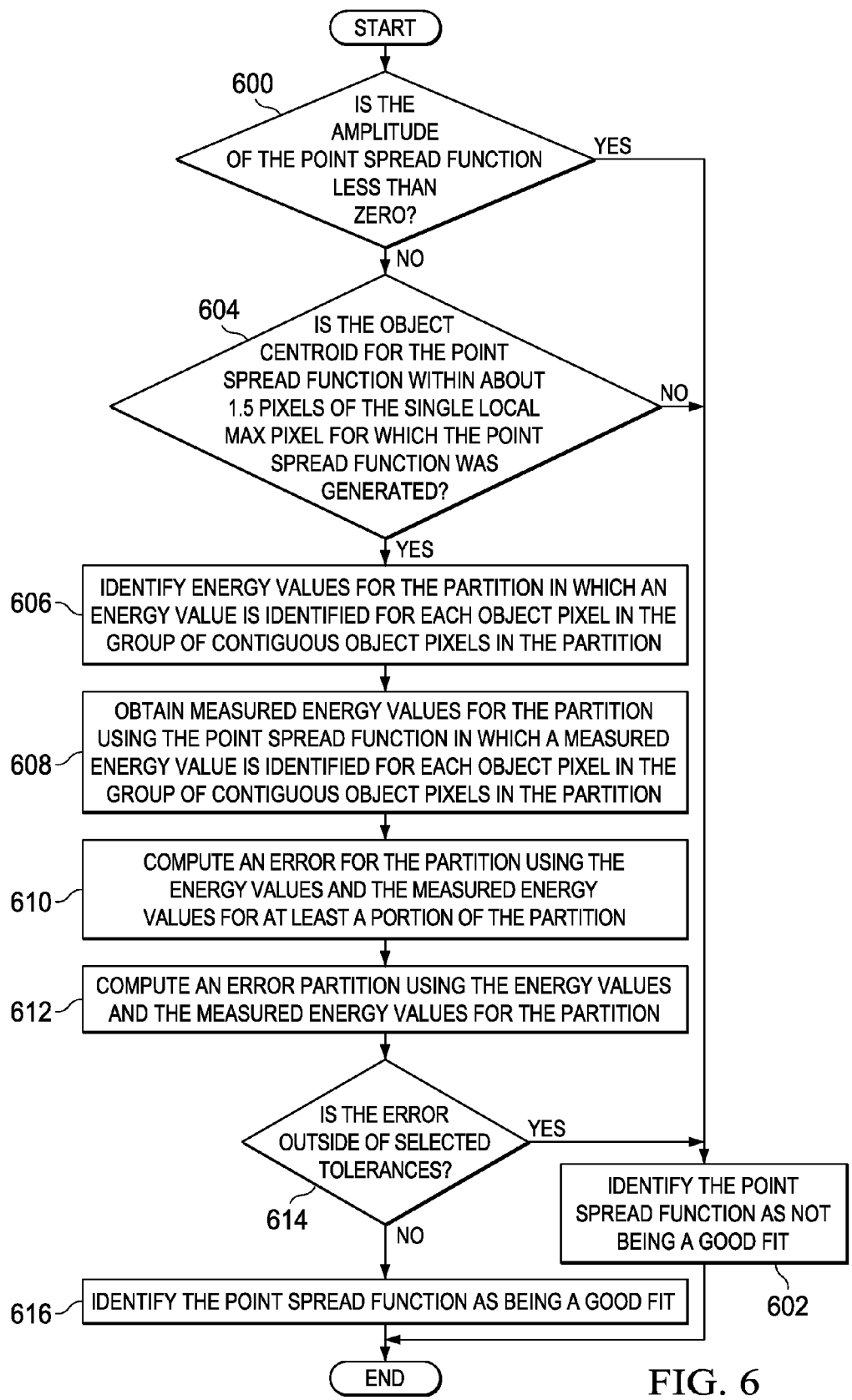
FIG. 6 is an illustration of a process for determining whether a point spread function generated for a single local max pixel is a good fit in the form of a flowchart in accordance with an illustrative embodiment.

With reference now to FIG. 6, an illustration of a process for determining whether a point spread function generated for a single local max pixel is a good fit is depicted in the form of a flowchart in accordance with an illustrative embodiment. The process illustrated in FIG. 6 may be an example of one manner in which operation 406 in FIG. 4A may be implemented.

The process may begin by determining whether the amplitude, $I_0$, of the point spread function is less than zero (operation 600). If the amplitude, $I_0$, of the point spread function is less than zero, the point spread function is identified as not being a good fit (operation 602), with the process terminating thereafter.

Otherwise, if the amplitude, $I_0$, of the point spread function is not less than zero, a determination is made as to whether the object centroid for the point spread function is within about 1.5 pixels of the single local max pixel for which the point spread function was generated (operation 604). If the object centroid for the point spread function is not within about 1.5 pixels of the single local max pixel, the process proceeds to operation 602 as described above.

Otherwise, energy values for the partition are identified in which an energy value is identified for each object pixel in the group of contiguous object pixels in the partition (operation 606). In operation 606, the energy value for an object pixel may be the pixel value of that object pixel. In other illustrative examples, the energy values may be referred to as energy pixel values.

Next, measured energy values are obtained for the partition using the point spread function in which a measured energy value is identified for each object pixel in the group of contiguous object pixels in the partition (operation 608). In operation 608, the measured energy value for an object pixel may be the expected pixel value for that object pixel based on the point spread function.

In particular, the measured energy value for an object pixel may be obtained by computing the product of the ensquare energy value for that object pixel and the amplitude of the point spread function. The ensquare energy value may be the fractional energy of the point spread function that is expected to be captured within the object pixel. In other illustrative examples, the measured energy values may be referred to as the computed energy values.

Thereafter, an error is computed for the partition using the energy values and the measured energy values for at least a portion of the partition (operation 610). In some cases, in operation 610, only the energy values and the measured energy values for the object pixels having a high signal-to-noise ratio may be used to compute the error. For example, a signal-to-noise threshold may be applied to the object pixels to determine which of the object pixels have a high signal-to-noise ratio. This signal-to-noise threshold may be, for example, without limitation, the sum of (1) the mean pixel value for all of the object pixels and (2) the product of a constant and a noise factor. The noise factor may be based on the pixel to pixel standard deviation. Both the noise factor and the constant may be obtained based on the characteristics of the imaging system that generated the image. For example, the noise factor and the constant may be obtained empirically based on the characteristics of the imaging system. In one illustrative example, the constant may be between about 4 and 6.

In operation 610, the error may include a fractional error, a normalized least squares fit error, a least squares fit error, some other type of error, or some combination thereof. The least squares fit error may be computed as follows:

$$\sigma_{LSF}^2 = \frac{1}{n_{g'} - 2} \sum_{i \in \{G'\}} \left( \sum_{k=0}^{n-1} (I_0)_n E_{n,Xi,Yi}^{LSF} - p_i \right)^2 \quad (4)$$

where $\sigma_{LSF}^2$ is the least squares fit error, $(I_0)_n E_{n,Xi,Yi}^{LSF}$ is the measured energy value for the $i^{th}$ pixel, $E_{n,Xi,Yi}^{LSF}$ is the ensquare energy value for the $i^{th}$ pixel, n is the number of local max pixels identified which may be 1 in this illustrative example, G' is the portion of the high signal-to-noise ratio pixels in the group of contiguous object pixels, $n_{g'}$ is the size of the portion of the high signal-to-noise ratio pixels in the group of contiguous object pixels, $p_i$ is the energy value for the $i^{th}$ pixel, and Xi,Yi are the coordinates of the $i^{th}$ pixel. As described above, the energy value, $p_i$, for the $i^{th}$ pixel may be the pixel value of the $i^{th}$ pixel.

The normalized least squares fit error may be computed as follows:

$$\sigma_{norm}^2 = \sigma_{LSF}^2/(I_0)_2 \quad (5)$$

where $\sigma_{norm}^2$ is the normalized least squares fit error.

The fractional error may be computed as follows:

$$\sigma_{Frac} = \frac{1}{n_{g'} - 2} \sum_{i \in \{G'\}} \begin{cases} \left| 1 - p_i \middle/ \left( \sum_{k=0}^{n-1} (I_0)_n E_{n,Xi,Yi}^{LSF} \right) \right| & \sum_{k=0}^{n-1} E_{n,Xi,Yi}^{LSF} > 0 \\ 1 & \text{otherwise} \end{cases} \quad (6)$$

where $\sigma_{Frac}$ is the fractional error.

Next, an error partition is computed using the energy values and the measured energy values for the partition (operation 612). The error partition computed in operation 612 may be comprised of error pixels that correspond directly to the group of contiguous object pixels. Each error pixel may have an error pixel value that may be given as follows:

$$e_i = e_{Frac}(X_i, Y_i) = \begin{cases} \left| 1 - p_i \middle/ \left( \sum_{k=0}^{n-1} (I_0)_n E_{n,Xi,Yi}^{LSF} \right) \right| & \sum_{k=0}^{n-1} E_{n,Xi,Yi}^{LSF} > 0 \\ 1 & \text{otherwise} \end{cases} \quad (7)$$

where $e_i$ is the error pixel corresponding to the $i^{th}$ pixel in the group of contiguous object pixels positioned at $X_i, Y_i$.

A determination may be made as to whether the error is outside of selected tolerances (operation 614). In operation 614, this determination may be made by determining whether any of the different types of errors that comprise the error is above a selected threshold. In other illustrative examples, this determination may be made based on whether the average of these errors is above the selected threshold. The selected threshold may be, for example, without limitation, about 0.05, about 0.075, about 0.10, about 0.25, about 0.3, or some other threshold.

With reference to operation 614, if the error is outside of the selected tolerances, the process proceeds to operation 602 as described above. Otherwise, the process identifies the point spread function as being a good fit (operation 616), with the process terminating thereafter.

A process similar to the process described in FIG. 6 may be used to evaluate the point spread functions generated for the plurality of sub-partitions in operation 418 in FIG. 4A above. If any one of the point spread functions is not a good fit, the entire plurality of point spread functions may not be considered a good fit. When dealing with the point spread function for a sub-partition, the measured energy value for an object pixel may be the product of the point spread function generated for the local max pixel corresponding to the sub-partition and the ensquare energy value based on that point spread function. The energy value may then be the pixel value of the object pixel with respect to the sub-partition.

In other illustrative examples, the point spread functions for the plurality of sub-partitions may be looked at collectively in operation 418. For example, the measured energy values for each sub-partition may be summed together to form overall measured energy values. These overall measured energy values may be the ones used in computing the error as described in FIG. 6. These overall measured energy values may be used in correspondence with the energy values for the partition, which may be the original pixel values for the object pixels in the partition.

Figure 7A:
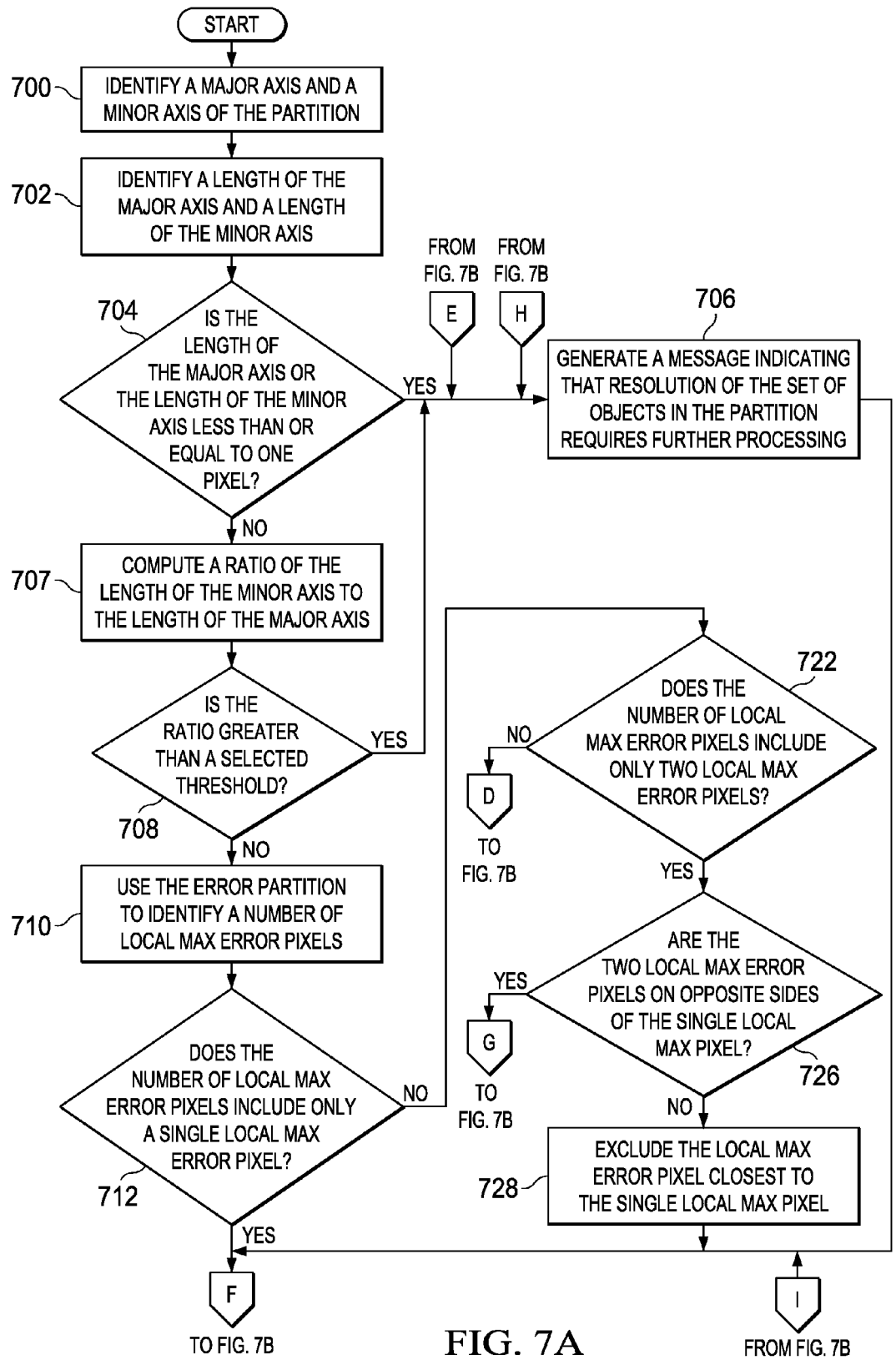
FIGS. 7A and 7B are illustrations of a process for identifying a new plurality of local max pixels in response to a point spread function generated for a single local max pixel not being a good fit in the form of a flowchart in accordance with an illustrative embodiment.
Figure 7B:
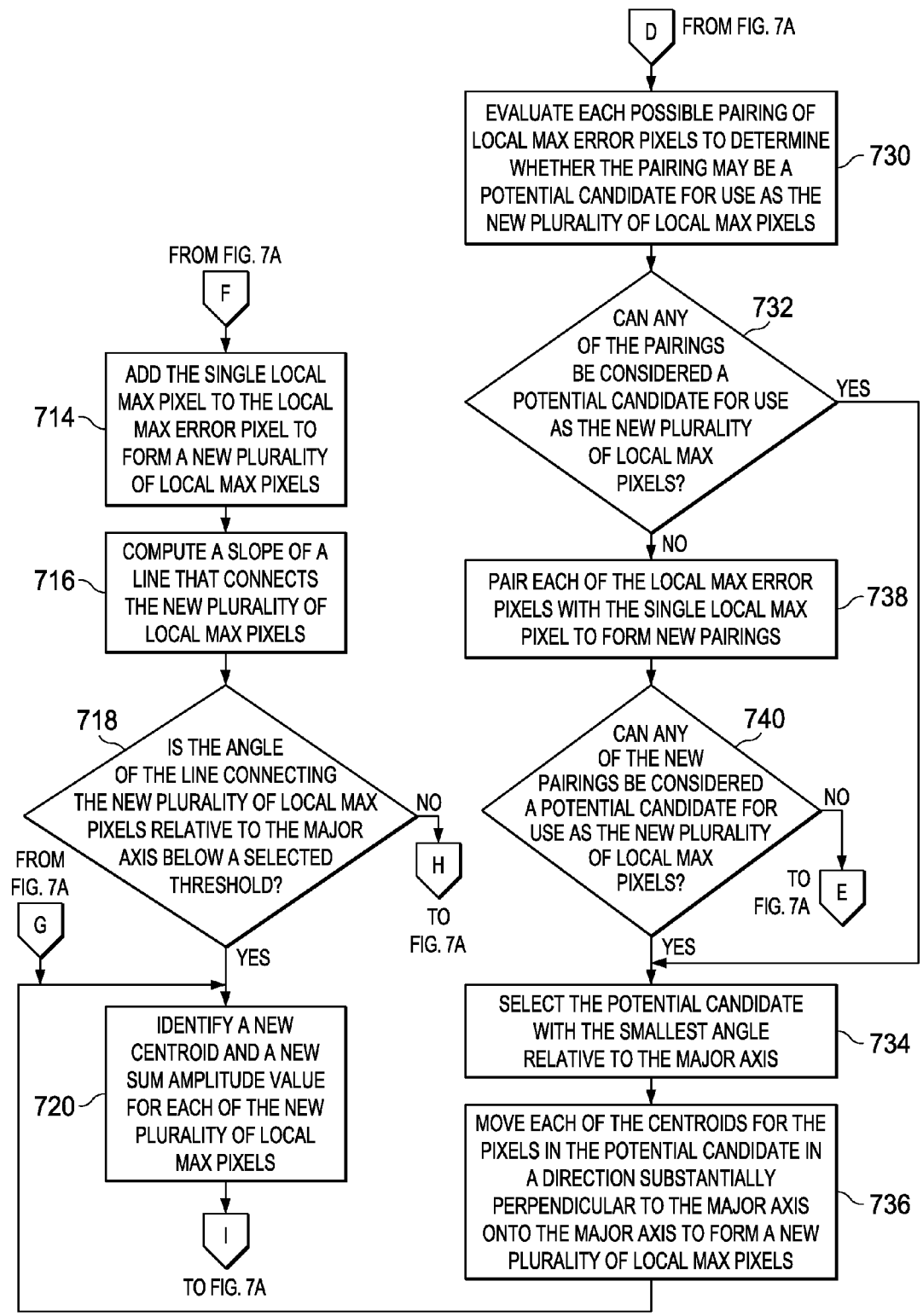

With reference now to FIGS. 7A and 7B, illustrations of a process for identifying a new plurality of local max pixels in response to a point spread function generated for a single local max pixel not being a good fit is depicted in accordance with an illustrative embodiment. The process illustrated in FIGS. 7A and 7B may be implemented using image processor 100 in FIGS. 1-2. Further, this process may be an example of one manner in which operation 412 in FIG. 4A may be performed.

The process begins by identifying a major axis and a minor axis of the partition (operation 700). In operation 700, the partition may be treated as an ellipsoid such that the major axis and the minor axis can be identified. Next, a length of the major axis and a length of the minor axis are identified (operation 702).

A determination may then be made as to whether the length of the major axis or the length of the minor axis is less than or equal to one pixel (operation 704). If either the length of the major axis or the length of the minor axis is less than or equal to one pixel, a message is generated indicating that resolution of the set of objects in the partition requires further processing (operation 706), with the process terminating thereafter. In other words, a solution is not found and other types of methods or additional processing may be needed to resolve the set of objects in the partition.

With reference again to operation 704, if both the length of the major axis and the length of the minor axis are greater than one pixel, a ratio of the length of the minor axis to the length of the major axis is computed (operation 707). A determination is made as to whether the ratio is greater than a selected threshold (operation 708). The selected threshold in operation 708 may be, for example, about 0.925. In other examples, the selected threshold may be between about 0.90 and 0.95.

If the ratio is greater than the selected threshold, the process proceeds to operation 706 described above. Otherwise, the error partition is used to identify a number of local max error pixels (operation 710). The error partition in operation 710 may be the error partition computed in operation 612 in FIG. 6. The number of local max error pixels may be identified in a manner similar to the manner in which the original number of local max pixels was identified.

A determination may then be made as to whether the number of local max error pixels includes only a single local max error pixel (operation 712). If the number of local max error pixels includes only a single local max error pixel, the single local max pixel is added to the remaining local max error pixel to form a new plurality of local max pixels (operation 714). The single local max pixel is the original single local max pixel identified in the original partition. A slope of a line that connects the new plurality of local max pixels is computed (operation 716). A determination is made as to whether the angle of the line connecting the new plurality of local max pixels relative to the major axis is below a selected threshold (operation 718).

If the angle is not below the selected threshold, the process proceeds to operation 706. Otherwise, a new centroid and a new sum amplitude value are identified for each of the new plurality of local max pixels (operation 720), with the process terminating thereafter.

With reference again to operation 712, if the number of local max error pixels includes more than a single local max pixel, a determination is made as to whether the number of local max error pixels includes only two local max error pixels (operation 722). If only two local max error pixels are present, a determination may then be made as to whether the two local max error pixels are on opposite sides of the single local max pixel (operation 726). For example, in operation 726, the determination is made based on whether the two local max error pixels fall on opposite sides of a line that runs substantially perpendicular to the major axis and through the single local max pixel.

If the two local max error pixels are on opposite sides of the single local max pixel, the process proceeds to operation 720 described above. Otherwise, the local max error pixel closest to the single local max pixel is excluded (operation 728), with the process then proceeding to operation 714 described above using the remaining local max error max pixel.

With reference again to operation 722, if more than two local max error pixels are present, each possible pairing of local max error pixels is evaluated to determine whether the pairing may be a potential candidate for use as the new plurality of local max pixels (operation 730). For example, in operation 730, if there are three local max error pixels, A, B, and C, then there are three possible pairings, A-B, A-C, and B-C.

In operation 730, each pairing may be evaluated by determining whether the angle of a line that intersects the two pixels in each pairing relative to the major axis is below a selected threshold and whether the two pixels are on opposite sides of the single local max pixel. Both of these criteria may need to be met in order for the pairing to be considered a potential candidate for use as the new plurality of local max pixels.

Next, a determination may be made as to whether any of the pairings may be considered a potential candidate for use as the new plurality of local max pixels (operation 732). If any pairings are considered potential candidates, the potential candidate with the smallest angle relative to the major axis is selected (operation 734). Each of the centroids for the pixels in the potential candidate selected is moved in a direction substantially perpendicular to the major axis onto the major axis (operation 736), with the process then proceeding to operation 720 described above.

With reference again to operation 732, if none of the pairings are considered potential candidates, each of the local max error pixels is paired with the single local max pixel to form new pairings (operation 738). Next, a determination may be made as to whether any of the new pairings may be considered a potential candidate for use as the new plurality of local max pixels (operation 740). If none of the pairings are considered potential candidates, the process proceeds to operation 706 as described above. Otherwise, the process proceeds to operation 734 as described above.

Figure 8:
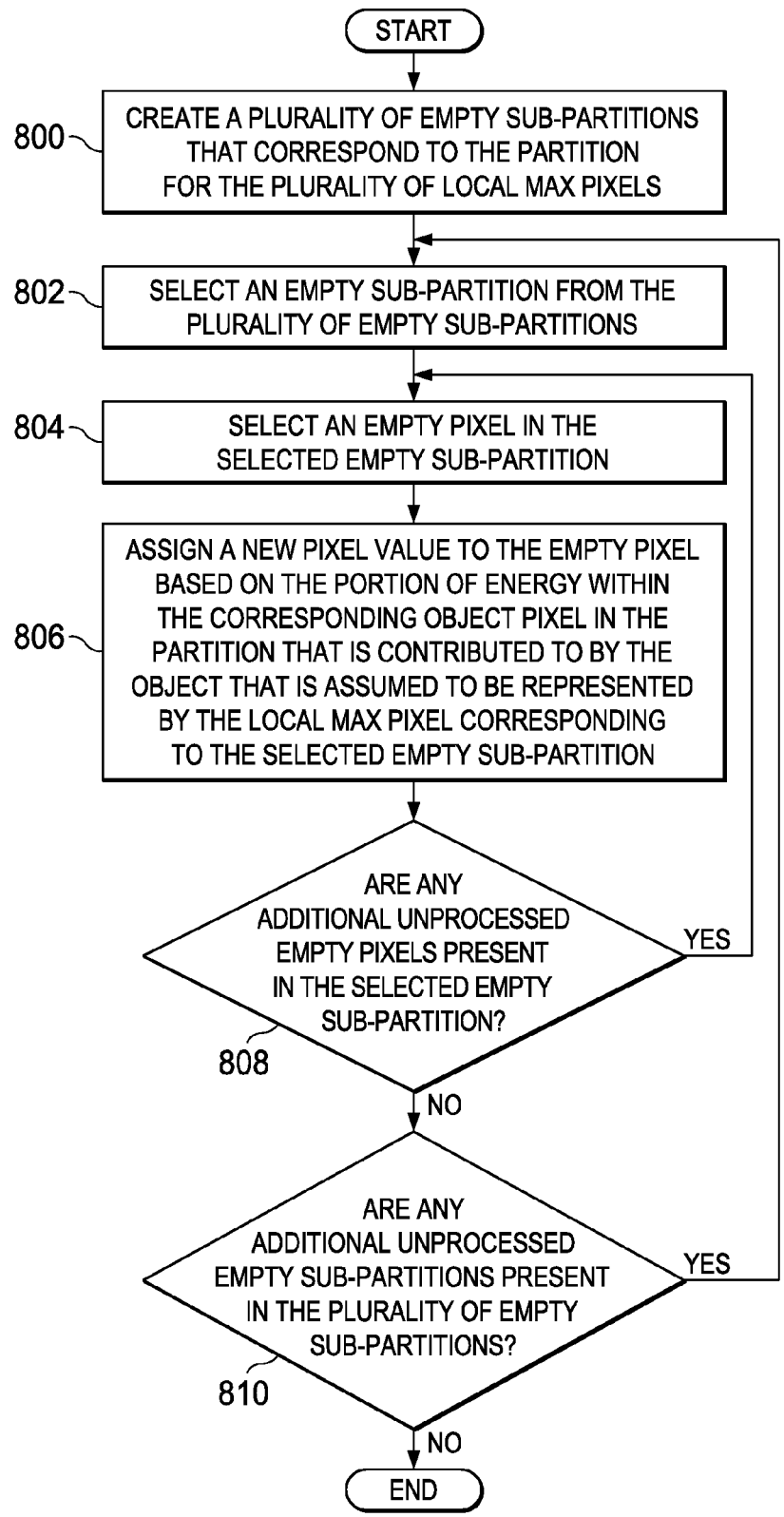
FIG. 8 is an illustration of a process for creating a plurality of sub-partitions in the form of a flowchart in accordance with an illustrative embodiment.

With reference now to FIG. 8, an illustration of a process for creating a plurality of sub-partitions is depicted in the form of a flowchart in accordance with an illustrative embodiment. The process illustrated in FIG. 8 may be implemented using image processor 100 in FIGS. 1-2. Further, this process may be an example of one manner in which operation 414 in FIG. 4A may be performed.

The process begins by creating a plurality of empty sub-partitions that correspond to the partition for the plurality of local max pixels (operation 800). Each of the plurality of empty sub-partitions may be designated for a corresponding one of the plurality of local max pixels. In operation 800, each of the plurality of empty sub-partitions has a same number of and arrangement of pixels as the group of contiguous object pixels in the partition. However, each empty sub-partition may have pixel values of zero. The pixels in each empty sub-partition may be referred to as empty pixels.

Next, an empty sub-partition is selected from the plurality of empty sub-partitions (operation 802). An empty pixel in the selected empty sub-partition is selected (operation 804). A new pixel value is assigned to the empty pixel based on the portion of energy within the corresponding object pixel in the partition that is contributed to by the object that is assumed to be represented by the local max pixel corresponding to the selected empty sub-partition (operation 806).

Operation 806 may be performed using the following equation:

$$p_{n,i} = \frac{AL_n En_{n,i_i}^2 p_i}{\sum_j AL_j En_{j,i_i}^2} \tag{8}$$

where $p_{n,i}$ is the pixel value for the $i^{th}$ pixel in the $n^{th}$ empty sub-partition, $AL_n$ is the sum amplitude value for the $n^{th}$ empty sub-partition, and $\sum_j AL_j En_{j,i}^2$ represents the total energy in the corresponding $i^{th}$ object pixel in the partition. In other illustrative examples, operation 806 may be performed using the following equations:

$$p_{n,i} = \frac{AL_n En_{n,X_i,Y_i}^{LSF} p_i}{\sum_j AL_j En_{j,X_i,Y_i}^{LSF}}, \tag{9}$$

where $$En_{n,X_i,Y_i}^{LSF} = E_{k,X_i,Y_i}^{LSF} = \frac{1}{N_{mfu}} \sum_{n=0}^{N_{mfu}-1} En^2(x_i, y_i, (x_l)_n, (y_l)_n) \tag{10}$$

or $$E_{k,X_i,Y_i}^{LSF} = \frac{1}{N_{mfu}} \sum_{n=0}^{N_{mfu}-1} En^2(x_i, y_i((x_l)_k)_n, ((y_l)_k)_n). \tag{11}$$

Equation 10 may be used when there is no streaking. Equation 11 may be used when there is streaking.

Thereafter, a determination may be made as to whether any additional unprocessed empty pixels are present in the selected empty sub-partition (operation 808). If any additional unprocessed empty pixels are present in the selected empty sub-partition, the process returns to operation 804 as described above. Otherwise, the sub-partition is no longer considered empty and a determination is made as to whether any additional unprocessed empty sub-partitions are present in the plurality of empty sub-partitions (operation 810). If any additional unprocessed empty sub-partitions are present in the plurality of empty sub-partitions, the process returns to operation 802 as described above. Otherwise, the plurality of sub-partitions is considered fully created and the process terminates.

Figure 9:
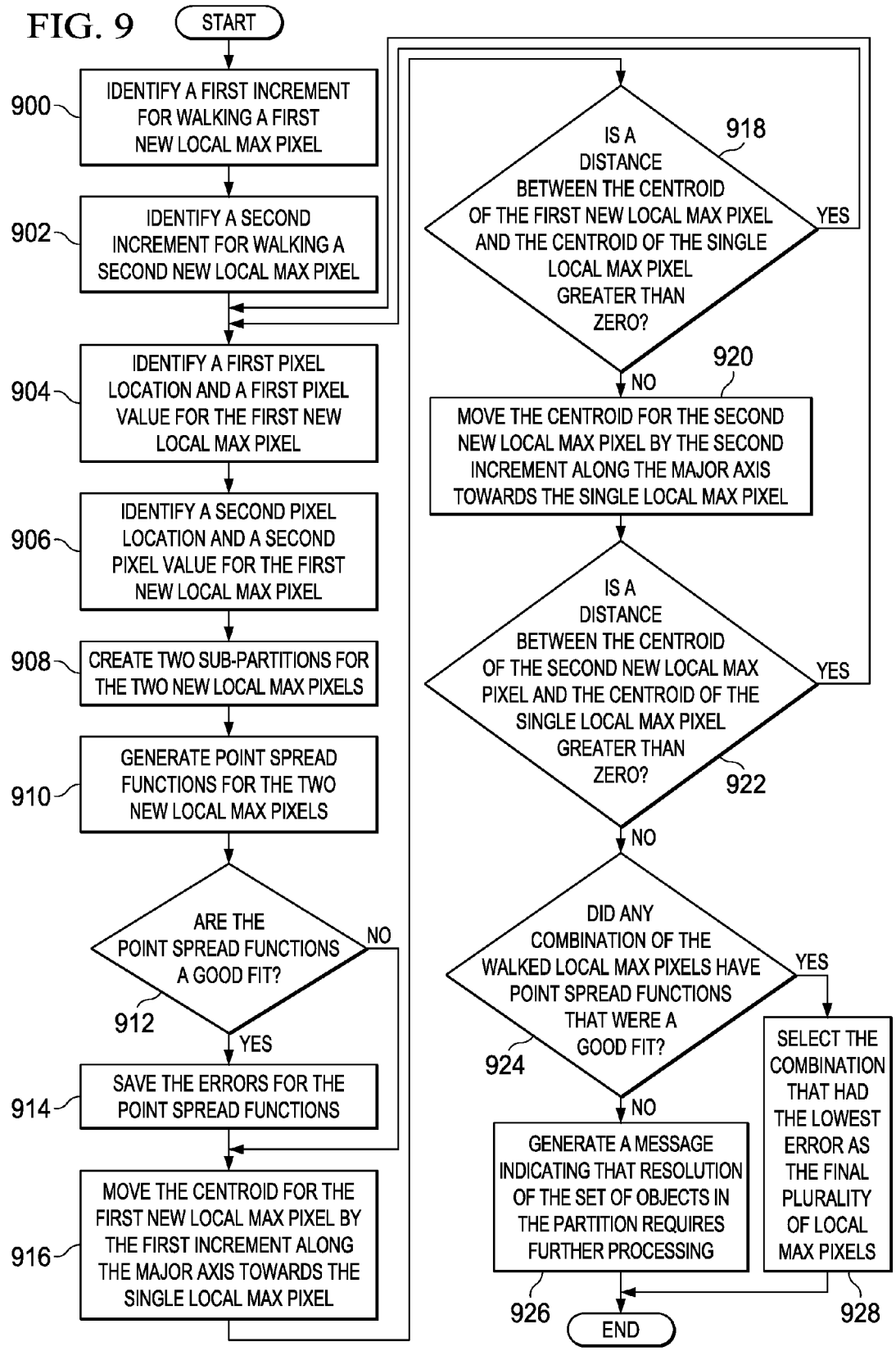
FIG. 9 is an illustration of a process for performing a walking algorithm in the form of a flowchart in accordance with an illustrative embodiment.

With reference now to FIG. 9, an illustration of a process for performing a walking algorithm is depicted in the form of a flowchart in accordance with an illustrative embodiment. The process illustrated in FIG. 9 may be implemented using image processor 100 in FIGS. 1-2. Further, this process may be used when two new plurality of local max pixels have been identified in response to the point spread function for a single local max pixel not being a good fit. This process may be an example of one manner in which operation 413 in FIG. 4A may be implemented.

The process begins by identifying a first increment for walking a first new local max pixel (operation 900). Next, a second increment for walking a second new local max pixel is identified (operation 902).

Thereafter, a first pixel location and a first pixel value for the first new local max pixel are identified (operation 904). A second pixel location and a second pixel value for the second new local max pixel are identified (operation 906).

Two sub-partitions are created for the two new local max pixels (operation 908). Point spread functions for the two new local max pixels are generated (operation 910). A determination is made as to whether the point spread functions are a good fit (operation 912). Operations 908, 910, and 912 may be implemented in a manner similar to operations 414, 416, and 418 in FIG. 4A.

If the point spread functions are a good fit, the errors for the point spread functions are saved (operation 914). Next, the centroid for the first new local max pixel is moved by the first increment along the major axis towards the single local max pixel (operation 916). In other words, the first new local max pixel may be "walked" towards the single local max pixel. A determination is made as to whether a distance between the centroid of the first new local max pixel and the centroid of the single local max pixel is greater than zero (operation 918).

If the distance is greater than zero, the process returns to operation 904 described above. If the distance is not greater than zero, the centroid for the second new local max pixel is moved by the second increment along the major axis towards the single local max pixel (operation 920). In other words, the second new local max pixel may be "walked" towards the single local max pixel.

A determination is made as to whether a distance between the centroid of the second new local max pixel and the centroid of the single local max pixel is greater than zero (operation 922). If the distance is greater than zero, the process returns to operation 904 described above.

Otherwise, a determination is made as to whether any combination of the walked local max pixels had point spread functions that were a good fit (operation 924). If none of the combinations had point spread functions that were a good fit, a message is generated indicating that resolution of the set of objects in the partition requires further processing (operation 926), with the process terminating thereafter. In other words, a solution is not found and other types of methods or additional processing may be needed to resolve the set of objects in the partition.

With reference again to operation 924, if at least one of the combinations had point spread functions that were a good fit, the combination that has the lowest error is selected as the final plurality of local max pixels (operation 928), with the process terminating thereafter. In operation 928, the centroid and sum amplitude value for each of the final plurality of local max pixels may also be identified. With reference again to operation 912, if the point spread functions are not a good fit, the process proceeds to operation 916 as described above.

Figure 10:
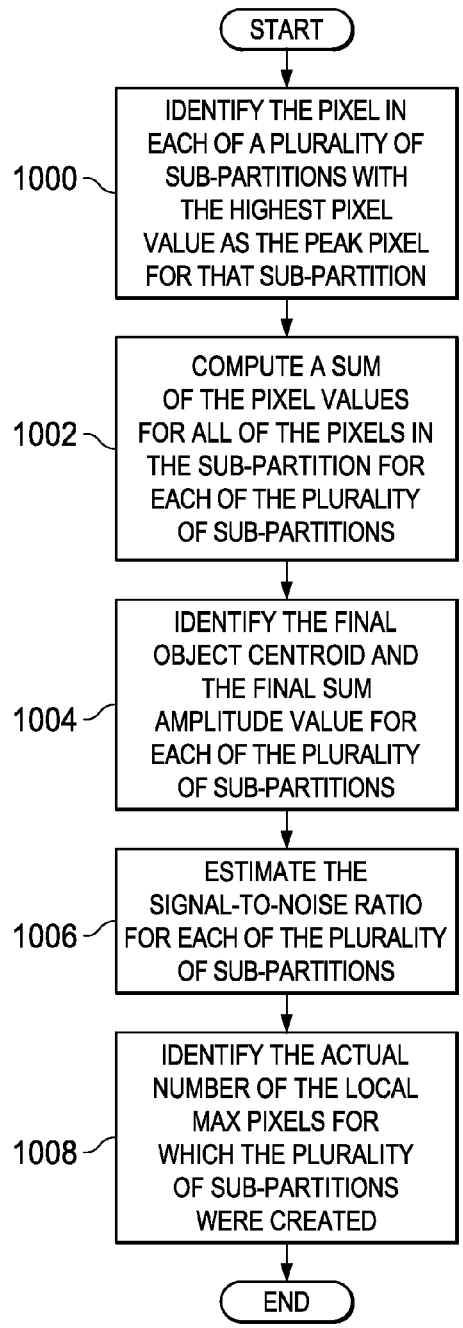
FIG. 10 is an illustration of a process for performing final computations after the local max pixel in each of a plurality of sub-partitions has been identified as representing an object in the form of a flowchart in accordance with an illustrative embodiment.

With reference now to FIG. 10, an illustration of a process for performing final computations after the local max pixel in each of a plurality of sub-partitions has been identified as representing an object is depicted in the form of a flowchart in accordance with an illustrative embodiment. The process illustrated in FIG. 10 may be implemented using image processor 100 in FIGS. 1-2.

The process begins by identifying the pixel in each of a plurality of sub-partitions with the highest pixel value as the peak pixel for that sub-partition (operation 1000). Next, a sum of the pixel values for all of the pixels in the sub-partition is computed for each of the plurality of sub-partitions (operation 1002). In operation 1002, this sum may be the simple amplitude for the $n^{th}$ object represented by the $n^{th}$ local max pixel in the $n^{th}$ sub-partition.

Next, the final object centroid and the final sum amplitude value partition are identified for each of the plurality of sub-partitions (operation 1004). Thereafter, the signal-to-noise ratio partition may be estimated for each of the plurality of sub-partitions (operation 1006).

The actual number of the local max pixels for which the plurality of sub-partitions were created is identified (operation 1008), with the process terminating thereafter. All of the information identified in the process described in FIG. 10 may be saved for use in future processing.

Figure 11:
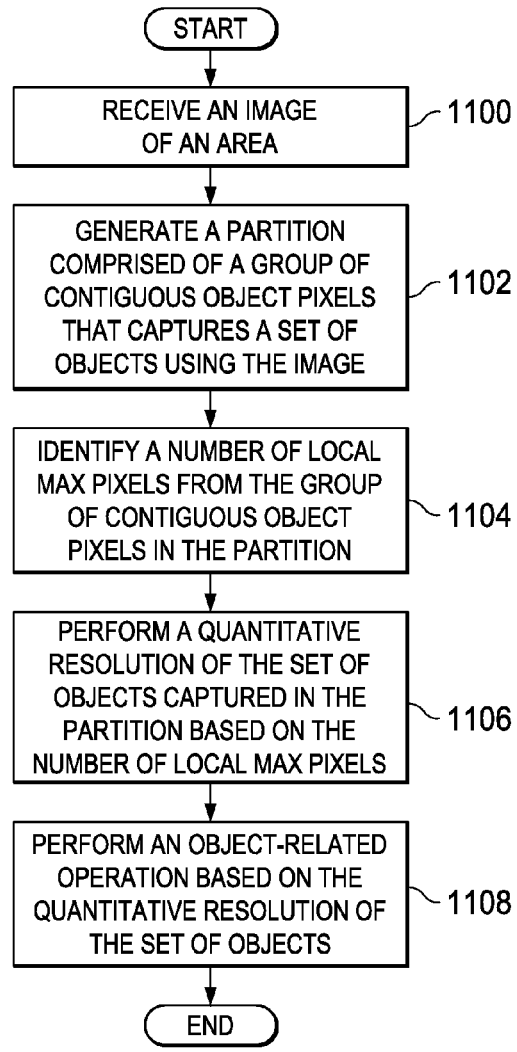
FIG. 11 is an illustration of a process for resolving objects in an image in the form of a flowchart in accordance with an illustrative embodiment.

With reference now to FIG. 11, an illustration of a process for resolving objects in an image is depicted in the form of a flowchart in accordance with an illustrative embodiment. The process illustrated in FIG. 11 may be implemented using image processor 100 in FIGS. 1-2.

The process may begin by receiving an image of an area (operation 1100). Next, a partition comprised of a group of contiguous object pixels that captures a set of objects is generated using the image (operation 1102). A number of local max pixels are identified from the group of contiguous object pixels in the partition (operation 1104). Thereafter, a quantitative resolution of the set of objects captured in the partition is performed based on the number of local max pixels (operation 1106).

An object-related operation may then be performed based on the quantitative resolution of the set of objects (operation 1108), with the process terminating thereafter. The object-related operation may be an operation related to at least one object in the set of objects. In one illustrative example, the object-related operation may include the identifying of a position of one of the set of objects based on the quantitative resolution and then the performing of an operation dependent on this position in a manner that has a physical effect with respect to the object. For example, the object-related operation may include the targeting of a weapons system towards the object based on the position of the object. As a more specific example, when the object is a missile or a hostile projectile, the object-related operation may be the targeting of a weapons system at the missile or hostile projectile to reduce or eliminate a threat associated with the missile or hostile projectile.

In another illustrative example, the object-related operation may include the identifying of an orientation of a target platform with which the set of objects is physically associated and then performing an operation dependent on this orientation in a manner that has a physical effect with respect to the object. For example, when the target platform is a space platform such as a space station, the object-related operation may include adjusting the course of travel of an aerospace vehicle towards the space platform such that the aerospace vehicle may be docked with the space platform.

With reference now to FIG. 12, an illustration of a process for targeting a weapons system is depicted in the form of flowchart in accordance with an illustrative embodiment. The process illustrated in FIG. 12 may be implemented using, for example, image processor 100 in FIGS. 1-2.

The process may begin by receiving an image of an area (operation 1200). Next, the process may perform a quantitative resolution of a set of objects captured in a partition, which is generated using the image, based on a number of local max pixels identified in the partition (operation 1202). Then, a weapons system is targeted towards at least one of the set of objects based on the quantitative resolution of the set of objects (operation 1204), with the process terminating thereafter. The at least one of the set of objects may be an object of interest, such as, for example, without limitation, a missile, an unauthorized aircraft located in restricted airspace, an unauthorized projectile located in a restricted space, a hostile object, a reflector, a location marker, an astronomical object, or some other type of object.

With reference now to FIG. 13, an illustration of a process for adjusting a course of travel towards a target platform is depicted in the form of flowchart in accordance with an illustrative embodiment. The process illustrated in FIG. 13 may be implemented using, for example, image processor 100 in FIGS. 1-2.

The process may begin by receiving an image of an area (operation 1300). Next, the process may perform a quantitative resolution of a set of objects captured in a partition, which is generated using the image, based on a number of local max pixels identified in the partition (operation 1302). An orientation of a target platform with which the set of objects is physically associated may be identified using at least one of a set of object centroids and a set of object amplitudes identified for the set of objects as part of the quantitative resolution of the set of objects (operation 1304). Thereafter, a course of travel of a structure towards the target platform may be adjusted based on the orientation of the target platform (operation 1306), with the process terminating thereafter.

The structure may be, for example, without limitation, an aerospace vehicle, an unmanned aerospace vehicle, or some other type of vehicle or movable structure. The target platform may be, for example, without limitation, a space station, such as the International Space Station (ISS). The set of objects may be, for example, without limitation, a set of reflectors or a set of markers that is at least one of attached to or located on the target platform for use in locating the target platform such that the structure may find the target platform or dock with the target platform.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, a portion of an operation or step, some combination thereof.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 14:
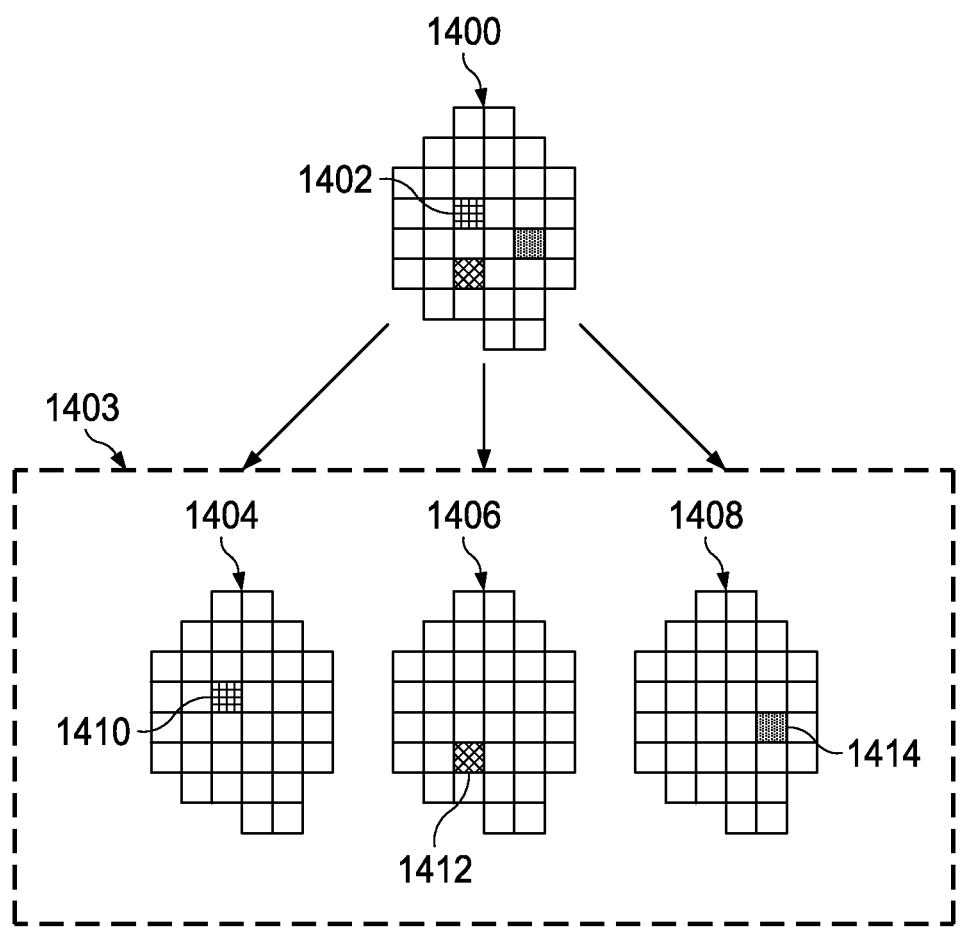
FIG. 14 is an illustration of a plurality of sub-partitions that have been created from a partition in accordance with an illustrative embodiment.

With reference now to FIG. 14, an illustration of a plurality of sub-partitions that have been created from a partition is depicted in accordance with an illustrative embodiment. Partition 1400 may be an example of one of partition 220 in FIG. 2. Further, partition 1400 may be an example of one of the set of partitions generated in operation 304 in FIG. 3.

Number of local max pixels 1402 may be identified in partition 1400. Number of local max pixels 1402 may be an example of one implementation for number of local max pixels 232 in FIG. 2. Further, number of local max pixels 1402 may be an example of the number of local max pixels that may be generated in operation 400 in FIG. 4A.

As depicted, plurality of sub-partitions 1403 may be created from partition 1400. Plurality of sub-partitions 1403 may be an example of the plurality of sub-partitions that may be created in operation 414 in FIG. 4A. Plurality of sub-partitions 1403 includes sub-partition 1404, sub-partition 1406, and sub-partition 1408. As depicted, sub-partition 1404, sub-partition 1406, and sub-partition 1408 are created for local max pixel 1410, local max pixel 1412, and local max pixel 1414, respectively, from number of local max pixels 1402.

Figure 15:
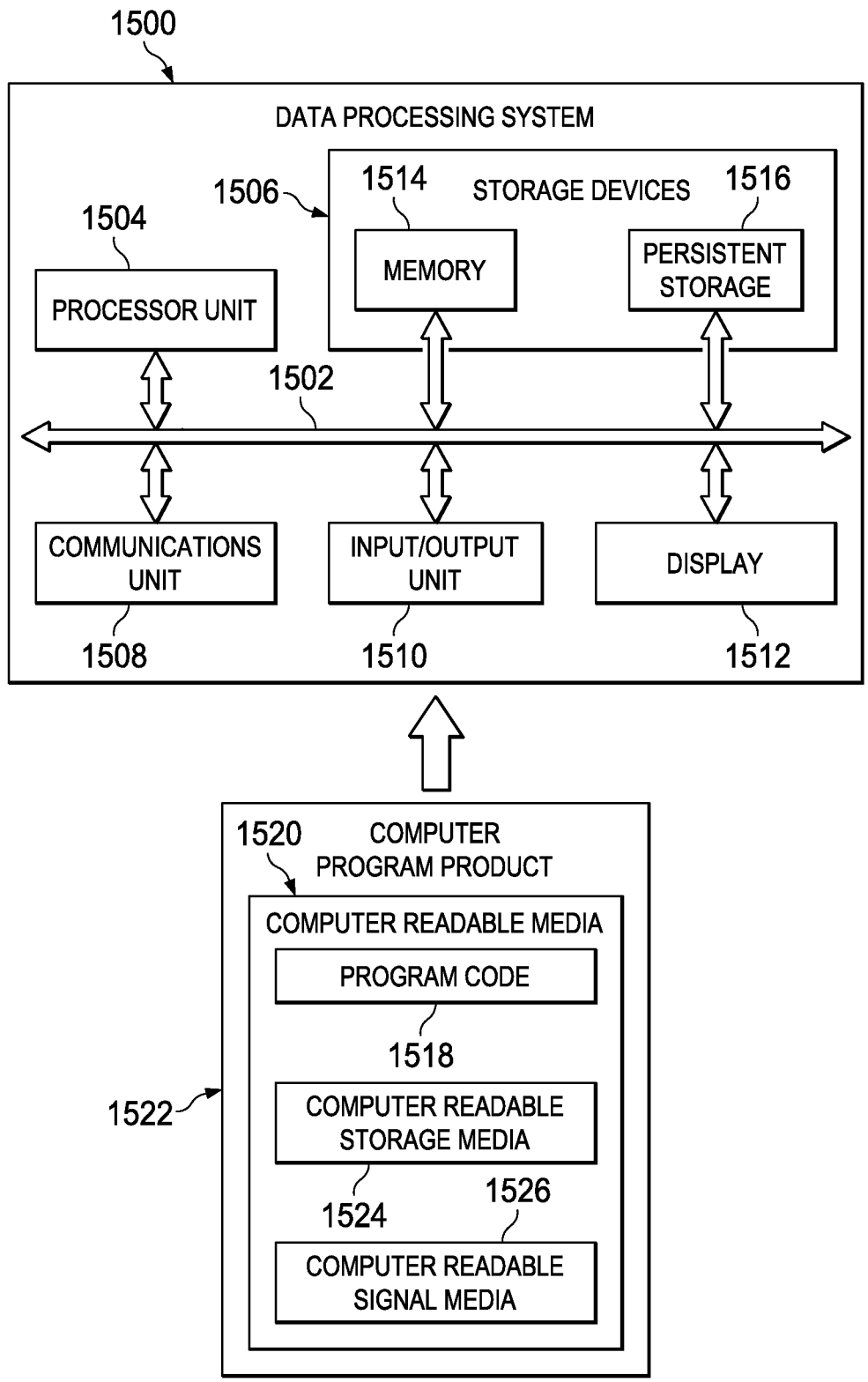
FIG. 15 is an illustration of a data processing system in the form of a block diagram in accordance with an illustrative embodiment.

Turning now to FIG. 15, an illustration of a data processing system is depicted in the form of a block diagram in accordance with an illustrative embodiment. Data processing system 1500 may be used to implement computer system 106 in FIG. 1. As depicted, data processing system 1500 includes communications framework 1502, which provides communications between processor unit 1504, storage devices 1506, communications unit 1508, input/output unit 1510, and display 1512. In some cases, communications framework 1502 may be implemented as a bus system.

Processor unit 1504 is configured to execute instructions for software to perform a number of operations. Processor unit 1504 may comprise at least one of a number of processors, a multi-processor core, or some other type of processor, depending on the implementation. In some cases, processor unit 1504 may take the form of a hardware unit, such as a circuit system, an application specific integrated circuit (ASIC), a programmable logic device, or some other suitable type of hardware unit.

Instructions for the operating system, applications and programs run by processor unit 1504 may be located in storage devices 1506. Storage devices 1506 may be in communication with processor unit 1504 through communications framework 1502. As used herein, a storage device, also referred to as a computer readable storage device, is any piece of hardware capable of storing information on a temporary basis, a permanent basis, or both. This information may include, but is not limited to, data, program code, other information, or some combination thereof.

Memory 1514 and persistent storage 1516 are examples of storage devices 1506. Memory 1514 may take the form of, for example, a random access memory or some type of volatile or non-volatile storage device. Persistent storage 1516 may comprise any number of components or devices. For example, persistent storage 1516 may comprise a hard drive, a flash memory, a rewritable optical disk, a rewritable magnetic tape, or some combination of the above. The media used by persistent storage 1516 may or may not be removable.

Communications unit 1508 enables data processing system 1500 to communicate with other data processing systems, devices, or both. Communications unit 1508 may provide communications using physical communications links, wireless communications links, or both.

Input/output unit 1510 enables input to be received from and output to be sent to other devices connected to data processing system 1500. For example, input/output unit 1510 may enable user input to be received through a keyboard, a mouse, some other type of input device, or a combination thereof. As another example, input/output unit 1510 may enable output to be sent to a printer connected to data processing system 1500.

Display 1512 is configured to display information to a user. Display 1512 may comprise, for example, without limitation, a monitor, a touch screen, a laser display, a holographic display, a virtual display device, some other type of display device, or a combination thereof.

In this illustrative example, the processes of the different illustrative embodiments may be performed by processor unit 1504 using computer-implemented instructions. These instructions may be referred to as program code, computer usable program code, or computer readable program code and may be read and executed by one or more processors in processor unit 1504.

In these examples, program code 1518 is located in a functional form on computer readable media 1520, which is selectively removable, and may be loaded onto or transferred to data processing system 1500 for execution by processor unit 1504. Program code 1518 and computer readable media 1520 together form computer program product 1522. In this illustrative example, computer readable media 1520 may be computer readable storage media 1524 or computer readable signal media 1526.

Computer readable storage media 1524 is a physical or tangible storage device used to store program code 1518 rather than a medium that propagates or transmits program code 1518. Computer readable storage media 1524 may be, for example, without limitation, an optical or magnetic disk or a persistent storage device that is connected to data processing system 1500.

Alternatively, program code 1518 may be transferred to data processing system 1500 using computer readable signal media 1526. Computer readable signal media 1526 may be, for example, a propagated data signal containing program code 1518. This data signal may be an electromagnetic signal, an optical signal, or some other type of signal that can be transmitted over physical communications links, wireless communications links, or both.

The illustration of data processing system 1500 in FIG. 15 is not meant to provide architectural limitations to the manner in which the illustrative embodiments may be implemented. The different illustrative embodiments may be implemented in a data processing system that includes components in addition to or in place of those illustrated for data processing system 1500. Further, components shown in FIG. 15 may be varied from the illustrative examples shown.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for resolving a set of objects in an image of an area, the method comprising:
    generating a partition that captures the set of objects in the area using the image, wherein the partition is comprised of a group of contiguous object pixels;
    identifying a number of local max pixels from the group of contiguous object pixels in the partition;
    performing a quantitative resolution of the set of objects captured in the partition based on the number of local max pixels identified; and
    performing an object-related operation based on the quantitative resolution of the set of objects wherein performing the object-related operation comprises targeting a weapons system towards at least one of the set of objects based on the quantitative resolution of the set of objects by:
        identifying an object from the set of objects as an object of interest based on an object amplitude for the object identified as part of the quantitative resolution of the set of objects,
        identifying a position of the object of interest based on an object centroid for the object identified as part of the quantitative resolution of the set of objects, and
        targeting the weapons system towards the object of interest using the position of the object of interest.

2. The method of claim 1, wherein performing the quantitative resolution comprises:
    computing a cardinality of the set of objects captured in the partition; and
    computing a contribution of each of the set of objects to a total energy of each object pixel in the group of contiguous object pixels in the partition.

3. The method of claim 1, wherein performing the quantitative resolution comprises:
    identifying a set of object centroids and a set of object amplitudes for the set of objects that are used to perform the object-related operation.

4. The method of claim 1, wherein generating the partition comprises:
    applying a noise threshold to the image to generate a filtered image comprised of object pixels and irrelevant pixels, wherein the irrelevant pixels have pixel values of substantially zero; and
    selecting the group of contiguous object pixels from the object pixels in the filtered image to generate the partition.

5. The method of claim 1, wherein performing the object-related operation comprises:
    identifying an orientation of a target platform with which the set of objects is physically associated using at least one of a set of object centroids or a set of object amplitudes identified for the set of objects as part of the quantitative resolution of the set of objects; and
    adjusting a course of travel of a structure towards the target platform based on the orientation of the target platform.

6. The method of claim 1, wherein identifying the number of local max pixels comprises:
identifying each object pixel in the group of contiguous object pixels that is entirely surrounded by other object pixels in the group of contiguous object pixels having lower pixel values than a pixel value of the each object pixel as a local max pixel.

7. The method of claim 1, wherein performing the quantitative resolution comprises:
determining whether the number of local max pixels is comprised of a single local max pixel or a plurality of local max pixels.

8. The method of claim 7, wherein performing the quantitative resolution further comprises:
responsive to a determination that the number of local max pixels comprises a plurality of local max pixels, creating a plurality of sub-partitions for the plurality of local max pixels, wherein each of the plurality of sub-partitions includes a corresponding local max pixel.

9. The method of claim 8, wherein performing the quantitative resolution further comprises:
computing a centroid and a sum amplitude value for each of the plurality of local max pixels based on a local pixel grid centered at the each of the plurality of local max pixels within a corresponding sub-partition of the plurality of sub-partitions;
generating point spread functions for the plurality of local max pixels with respect to the plurality of sub-partitions using the centroid for the each of the plurality of local max pixels and a least squares fit algorithm; and
determining whether the points spread functions are a good fit based on an error computed using the point spread functions to determine whether the each of the plurality of local max pixels represents an object.

10. The method of claim 1 further comprising:
receiving the image from an imaging system, wherein the image is selected from one of a set of still images generated by the imaging system and one of a set of frames in a video generated by the imaging system.

11. A method for resolving a set of objects in an image of an area, the method comprising:
generating a partition that captures the set of objects in the area using the image, wherein the partition is comprised of a group of contiguous object pixels;
identifying a number of local max pixels from the group of contiguous object pixels in the partition;
performing a quantitative resolution of the set of objects captured in the partition based on the number of local max pixels identified;
determining whether the number of local max pixels is comprised of a single local max pixel or a plurality of local max pixels;
responsive to a determination that the number of local max pixels comprises the single local max pixel, computing a centroid and a sum amplitude value for the single local max pixel based on a local pixel grid centered at the single local max pixel; and
generating a point spread function for the single local max pixel using the centroid and a least squares fit algorithm.

12. The method of claim 11, wherein performing the quantitative resolution further comprises:
computing measured energy values for the partition using the point spread function; and
computing an error based on the measured energy values and energy values for the partition to determine whether the single local max pixel represents a single object or a plurality of closely spaced objects.

13. A method for resolving objects in an image of an area, the method comprising:
generating a partition that captures a set of objects in the area using the image, wherein the partition is comprised of a group of contiguous object pixels;
identifying a number of local max pixels from the group of contiguous object pixels in the partition;
performing a quantitative resolution of the set of objects captured in the partition based on the number of local max pixels identified to identify a set of object centroids and a set of object amplitudes for the set of objects;
performing an object-related operation corresponding to at least one of the set of objects based on at least one of the set of object centroids or the set of object amplitudes;
determining whether the number of local max pixels is comprised of a single local max pixel or a plurality of local max pixels;
responsive to a determination that the number of local max pixels comprises the single local max pixel, computing a centroid and a sum amplitude value for the single local max pixel based on a local pixel grid centered at the single local max pixel; and
generating a point spread function for the single local max pixel using the centroid and a least squares fit algorithm.

14. An apparatus comprising:
an image processor that:
identifies a partition that captures a set of objects in an area using an image, wherein the partition is comprised of a group of contiguous object pixels;
identifies a number of local max pixels from the group of contiguous object pixels in the partition;
performs a quantitative resolution of the set of objects captured in the partition based on the number of local max pixels identified such that an object-related operation corresponding to at least one object in the set of objects can be performed based on the quantitative resolution;
determines whether the number of local max pixels is comprised of a single local max pixel or a plurality of local max pixels;
responsive to a determination that the number of local max pixels comprises the single local max pixel, computes a centroid and a sum amplitude value for the single local max pixel based on a local pixel grid centered at the single local max pixel; and
generates a point spread function for the single local max pixel using the centroid and a least squares fit algorithm.

15. The apparatus of claim 14, wherein the image processor computes a cardinality of the set of objects captured in the partition and a contribution of each of the set of objects to a total energy of each object pixel in the group of contiguous object pixels in the partition.

16. The apparatus of claim 14, wherein the image processor identifies a set of object centroids and a set of object amplitudes for the set of objects.

* * * * *